United States Patent
Hitosugi

(10) Patent No.: US 8,855,438 B2
(45) Date of Patent: Oct. 7, 2014

(54) IMAGE PROCESSING APPARATUS, IMAGE PROCESSING METHOD OF IMAGE PROCESSING APPARATUS, AND PROGRAM

(75) Inventor: Takayuki Hitosugi, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 13/466,447

(22) Filed: May 8, 2012

(65) Prior Publication Data

US 2012/0288211 A1  Nov. 15, 2012

(30) Foreign Application Priority Data

May 13, 2011  (JP) ................................ 2011-108580

(51) Int. Cl.
*G06K 9/36*  (2006.01)

(52) U.S. Cl.
USPC .......................................................... 382/239

(58) Field of Classification Search
None
See application file for complete search history.

(56) References Cited

U.S. PATENT DOCUMENTS

| 5,539,865 | A * | 7/1996 | Gentile | 358/1.16 |
| 7,043,077 | B2 * | 5/2006 | Rijavec | 382/164 |
| 8,515,188 | B2 * | 8/2013 | Ogura | 382/232 |
| 2001/0031092 | A1 * | 10/2001 | Zeck et al. | 382/239 |
| 2003/0090709 | A1 * | 5/2003 | Rijavec | 358/1.15 |
| 2003/0095723 | A1 * | 5/2003 | Ishizaka et al. | 382/298 |
| 2003/0117637 | A1 * | 6/2003 | Coleman | 358/1.13 |
| 2004/0047519 | A1 * | 3/2004 | Gennart et al. | 382/298 |
| 2004/0109197 | A1 * | 6/2004 | Gardaz et al. | 358/1.15 |
| 2005/0276496 | A1 * | 12/2005 | Molgaard et al. | 382/244 |
| 2006/0083432 | A1 * | 4/2006 | Malvar | 382/232 |
| 2006/0262994 | A1 * | 11/2006 | Patera et al. | 382/276 |
| 2007/0035747 | A1 * | 2/2007 | Ishii et al. | 358/1.2 |
| 2007/0098283 | A1 * | 5/2007 | Kim et al. | 382/239 |
| 2008/0069464 | A1 * | 3/2008 | Nakayama | 382/244 |
| 2008/0144952 | A1 * | 6/2008 | Chen et al. | 382/239 |
| 2008/0270753 | A1 * | 10/2008 | Achiwa et al. | 712/30 |
| 2010/0124380 | A1 * | 5/2010 | Shiraishi et al. | 382/239 |
| 2010/0142840 | A1 * | 6/2010 | Kajiwara et al. | 382/244 |
| 2011/0262051 | A1 * | 10/2011 | Morard et al. | 382/244 |

FOREIGN PATENT DOCUMENTS

| JP | 10-313411 A | 11/1998 |
| JP | 2008-072624 A | 3/2008 |

* cited by examiner

*Primary Examiner* — Sean Motsinger
(74) *Attorney, Agent, or Firm* — Canon USA Inc. IP Division

(57) ABSTRACT

An image processing apparatus includes an intermediate data generation unit configured to generate intermediate data having different attributes by compressing image data of each tile using a lossless compression method or a lossy compression method according to a tile attribute, an intermediate data rendering unit configured to generate raster image data by decompressing the generated intermediate data, and an enlargement unit configured to perform an enlargement process on the image data or the raster image data according to the tile attribute.

12 Claims, 19 Drawing Sheets

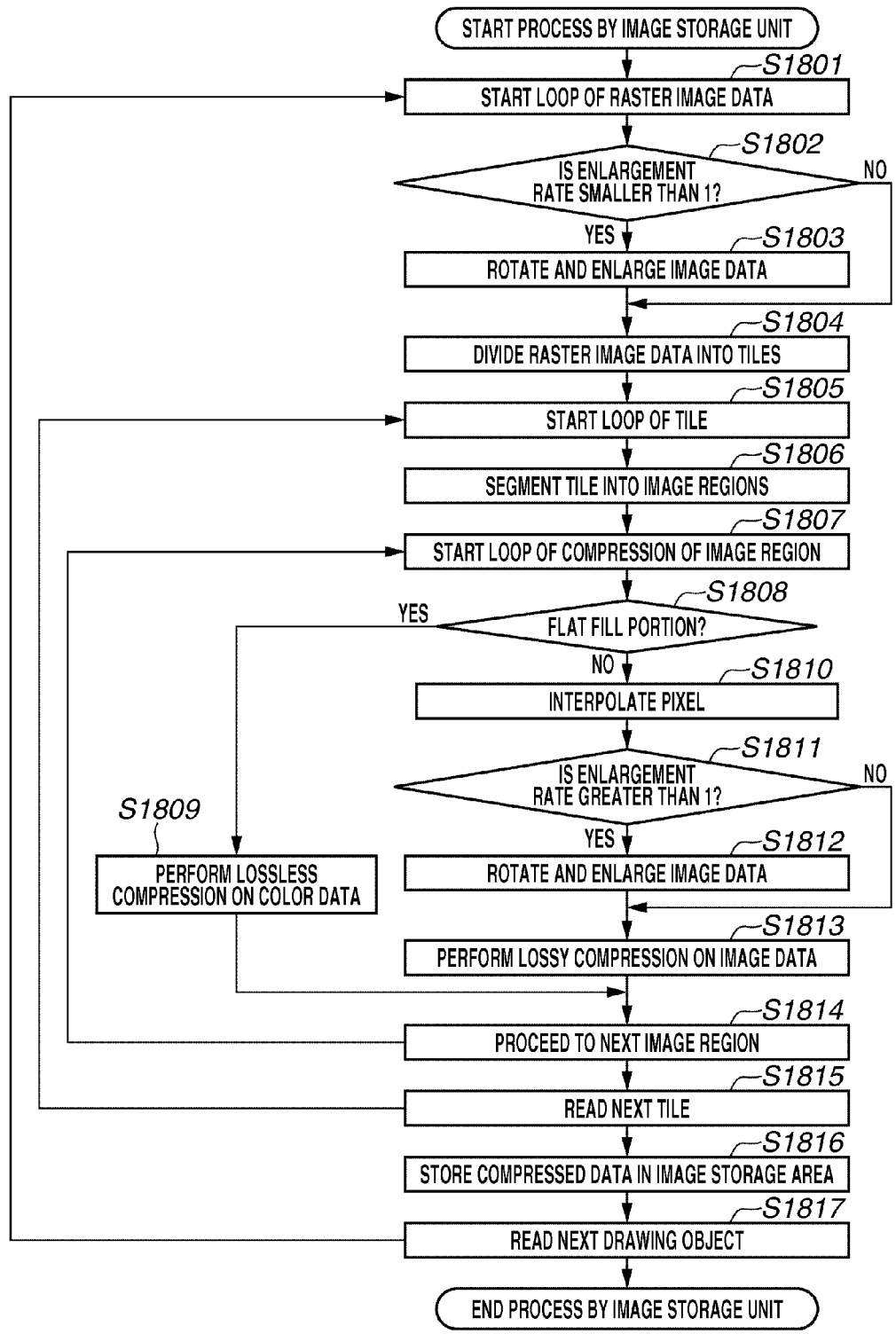

IMAGE PROCESSING APPARATUS, IMAGE PROCESSING METHOD OF IMAGE PROCESSING APPARATUS, AND PROGRAM

BACKGROUND OF THE INVENTION

1. Field of the Invention

The present invention relates to an image processing apparatus, an image processing method of an image processing apparatus, and a program.

2. Description of the Related Art

A scaling process in a rendering process by an image processing apparatus is a process for increasing or reducing the resolution of an input image to a predetermined resolution. A compression process and a decompression process in the rendering process are processes for compressing intermediate data generated based on input data and decompressing the compressed intermediate data, respectively.

For example, Japanese Patent Application Laid-Open No. 10-313411 discusses the following method. A compression rate is determined, for example, based on an enlargement rate of image data. Then, the image data is lossy-compressed and is written into a buffer memory. The image data is enlarged to a rendering resolution after being read from the buffer memory and decompressed.

Japanese Patent Application Laid-Open No. 2008-072624 discusses the following method. Image data is lossless-compressed on a tile-by-tile basis to generate lossless compressed data. Herein, each tile is determined whether to be lossless-compressed or lossy-compressed based on an image data attribute, so that each tile is correlated with lossless or lossy determination information. Whenever the number of tiles determined to be lossy-compressed exceeds a threshold, lossless compressed data with lossy determination information is reduced to a low resolution. When lossless compression for one page is finished, the lossless compressed data with lossy determination information is lossy-compressed and replaced with lossy compressed data. After each of the lossless compressed data and the lossy compressed data is decompressed, the data is increased to a rendering resolution.

FIGS. 17 and 18 are diagrams illustrating examples of compression, decompression, and enlargement processes in a conventional manner. In FIG. 17A, image data is enlarged, lossy-compressed, and then decompressed. Consequently, a size of the compressed data increases. The larger the data size of the compressed data, the longer the transfer time. FIG. 17B illustrates one conventional method for dealing with a case where a data size of compressed data exceeds a limit. When the data size of the compressed data exceeds the limit, image data is once decompressed so that a corresponding page is rendered and lossy-compressed. According to such a method, one entire page is lossy-compressed, causing quality deterioration of an output image.

Consequently, a method for performing an enlargement process subsequent to a lossy compression process has been employed particularly by an image processing apparatus with limited buffer memory. For example, in FIG. 18, image data is lossy-compressed, decompressed, and then enlarged. Such a method can prevent an increase in size of the compressed data due to the enlargement. However, a noise deteriorating the image quality caused by the lossy compression is later amplified by the enlargement process. As a result, the quality of an output image is markedly deteriorated.

SUMMARY OF THE INVENTION

According to an aspect of the present invention, an image processing apparatus includes a dividing unit configured to divide image data in PDL data on a tile-by-tile basis, determination unit configured to determine whether each of the tiles divided by the dividing unit has a tile attribute for lossless-compression or a tile attribute for lossy-compression, an intermediate data generation unit configured to generate intermediate data having different attributes by compressing each title of the image data using a lossless compression method or a lossy compression method according to the tile attribute determined by the determination unit, an intermediate data rendering unit configured to generate raster image data by decompressing the generated intermediate data, and an enlargement unit configured to perform an enlargement process on the image data or the raster image data according to the tile attribute determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 16 is a flowchart illustrating an image processing method of an image processing apparatus.

DESCRIPTION OF THE EMBODIMENTS

Various exemplary embodiments, features, and aspects of the invention will be described in detail below with reference to the drawings.

In an image process by a conventional image processing apparatus, a conventional configuration as mentioned in the description of the related art, uniformly enlarges entire image data before lossy compression is performed in the course of generating intermediate data by analyzing page description language (PDL) data. Consequently, a size of the generated intermediate data becomes large, and the lossy compression process is executed on the image data. When raster image data is generated from the intermediate data, therefore, image quality is significantly deteriorated. On the other hand, when an enlargement process is performed at the time of rendering intermediate data instead of executing the enlargement process in an intermediate data generation process, the noise deteriorating image quality caused by lossy compression to be executed in the intermediate data generation process is amplified.

Accordingly, the present invention provides a method for suppressing an increase in data size when intermediate data is generated from PDL data and reducing image quality deterioration in raster image data generation.

(Configuration of an Image Processing Apparatus)

Figure 1:
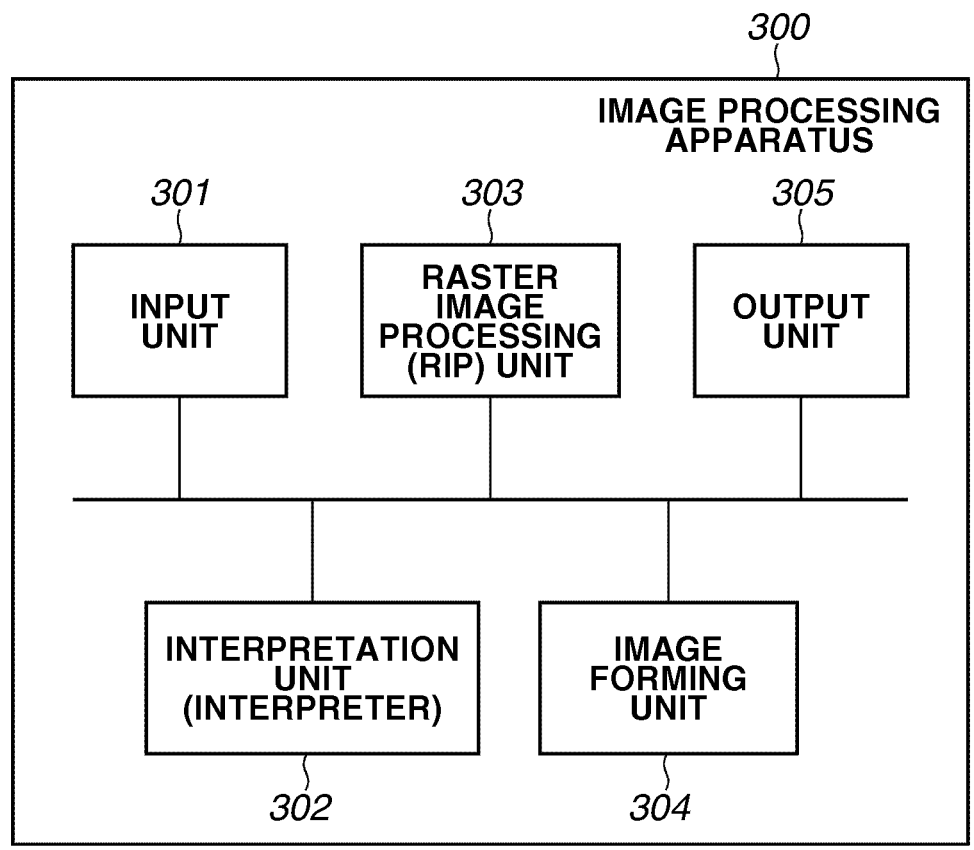
FIG. 1 is a block diagram illustrating a configuration of an image processing apparatus according to a present exemplary embodiment.

FIG. 1 is a block diagram illustrating a configuration of an image processing apparatus according to a first exemplary embodiment. Referring to FIG. 1, a description is given of the image processing apparatus for generating raster image data by generating intermediate data based on input PDL data and then rendering the intermediate data. In the present exemplary embodiment, an object refers to a drawing element constituted by an input drawing command. For example, objects include as their types bitmap graphics, flat graphics, gradation graphics, and text. A raster image refers to an object classified into bitmap graphics including photograph data, for example, bitmap (BMP) and a joint photographic expert group (JPEG). The raster image undergoes an image region determination process or an image region segmentation process, so that the raster image is determined and segmented as at least one of the image regions of a flat fill portion (single color data portion) and a bitmap portion. In the present exemplary embodiment, input PDL data undergoes a series of image processes including an intermediate data generation process, an intermediate data holding process, and an intermediate data rendering process, so that raster image data is generated.

In FIG. 1, an image processing apparatus 300 forms an image based on a drawing command, and outputs the image. The image processing apparatus 300 includes an input unit 301, an interpretation unit (interpreter) 302, a raster image processing (RIP) unit 303, an image forming unit 304, and an output unit 305.

The input unit 301 receives a drawing command from an external device connected to the image processing apparatus 300. Herein, the external device includes a data processing device and a server device which can communicate through a bidirectional communicable interface. For example, the bidirectional communicable interface includes a universal serial bus (USB) interface and a network interface. The server device, for example, is arranged in a web server environment.

The interpretation unit 302 interprets the drawing command received by the input unit 301. In the present exemplary embodiment, the drawing command is in a PDL format. The raster image processing unit 303 generates a raster image by performing rendering based on the drawing command interpreted by the interpretation unit 302. The image forming unit 304 performs an image process such as a halftone process on the raster image generated by the raster image processing unit 303, thereby forming an output image. The output unit 305 outputs the output image formed by the image forming unit 304. In the present exemplary embodiment, the image processing apparatus 300 is a multi-function printer (MFP), and the output unit 305 outputs the output image by printing the output image on a recording sheet.

The interpretation unit 302, the raster image processing unit 303, and the image forming unit 304 perform the respective processes by a central processing unit (CPU)executing various types of programs loaded to a random access memory (RAM). The raster image processing unit 303 may perform the process by an application specific integrated circuit (ASIC) for generating a raster image, instead of the CPU.

Figure 2:
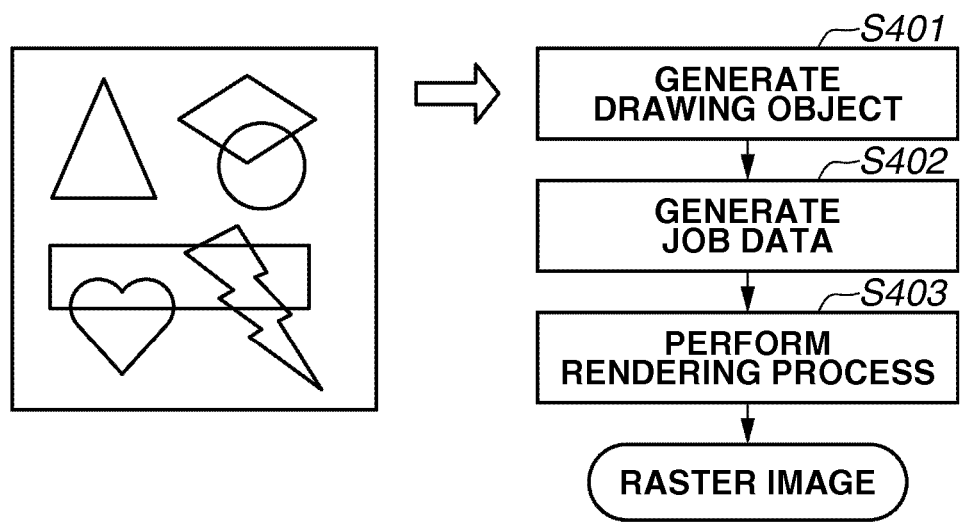
FIG. 2 is a flowchart illustrating an image processing method of the image processing apparatus.

Now, a process for generating a raster image by the raster image processing unit 303 is described in detail. FIG. 2 is a flowchart illustrating an image processing method of the image processing apparatus according to the present exemplary embodiment. This flowchart describes an example of a raster image generation process to be performed by the raster image processing unit 303. Hereinafter, a description is given of a data process which the raster image processing unit 303 executed by the CPU of the image processing apparatus 300 performs.

In step S401, the raster image processing unit 303 generates a drawing object based on a drawing command interpreted by the interpretation unit 302 illustrated in FIG. 1. There are plural types of drawing objects, and each drawing object is classified into any of the object types.

In step S402, the raster image processing unit 303 detects an edge of each object and generates job data based on coordinate information of the drawing object generated in step S401. In step S403, the raster image processing unit 303 performs a rendering process on the raster image based on the job data generated in S402. The job data will be described below.

Figure 3:
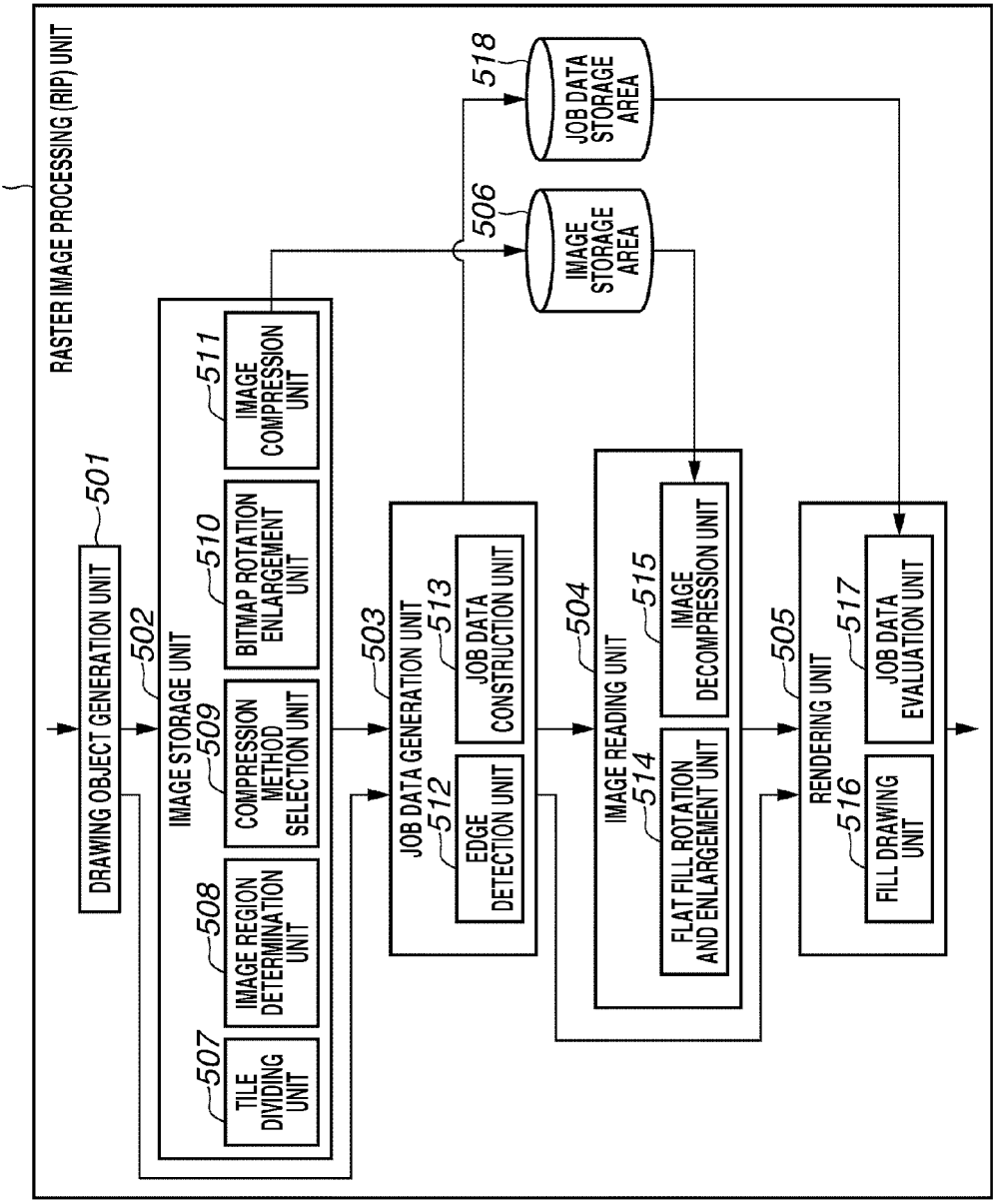
FIG. 3 is a block diagram illustrating various functions of a raster image processing (RIP) unit.

Next, an internal configuration of the raster image processing unit 303 is described in detail. FIG. 3 is a block diagram illustrating various functions of the raster image processing unit 303 illustrated in FIG. 1. In the following description, each of units is configured as a module by the CPU of the image processing apparatus 300. However, a portion of each unit may be configured as hardware.

In FIG. 3, the raster image processing unit 303 includes a drawing object generation unit 501, an image storage unit 502, a job data generation unit 503, an image reading unit 504, a rendering unit 505, an image storage area 506, and a job data storage area 518. The drawing object generation unit 501 receives a drawing command interpreted by the interpretation unit 302, and generates an object. A description is now given of a process for generating image data to be output to the image forming unit 304 by analyzing a drawing object.

(Configuration of Image Storage Unit 502)

The image storage unit 502 includes a tile dividing unit 507, an image region determination unit 508, a compression method selection unit 509, a bitmap rotation enlargement unit 510, and an image compression unit 511, each of which processes a raster image type object.

The tile dividing unit 507 functions as a module for dividing an object of a raster image into tiles. In the present exemplary embodiment, a tile represents an image block partitioned by the predetermined number of pixels with a width and a height (e.g., 64×64 in pixels).

The image region determination unit 508 executes a process for determining whether each tile is a flat fill portion or a bitmap portion. In the present exemplary embodiment, a flat fill portion is a tile in which all the pixels have the same single color, whereas a bitmap portion is a tile having two or more colors.

The compression method selection unit 509 selects a suitable compression method for each tile. In the present exemplary embodiment, the JPEG is selected as a compression method (lossy compression) for a tile of a bitmap portion. A compression method (lossless compression) for a flat fill portion will be described below.

The bitmap rotation enlargement unit 510 executes a process for rotating a tile of a bitmap portion and for enlarging the bitmap portion to a rendering resolution. In the present exemplary embodiment, the bitmap rotation enlargement unit 510 simultaneously executes the rotation and enlargement of the bitmap portion using an affine transformation.

The image compression unit 511 performs image compression on each tile according to the selected compression method. The raster image data in each compressed tile is stored in the image storage area 506.

(Configuration of Job Data Generation Unit 503)

The job data generation unit 503 includes an edge detection unit 512 and a job data construction unit 513. The edge detection unit 512 detects an edge of an object. The job data construction unit 513 generates job data including side information, a fill combining store, and fill information, and stores such job data in the job data storage area 518. A job data generation process to be performed by the job data generation unit 503 will be described below.

(Configuration of Image Reading Unit 504)

The image reading unit 504 includes a flat fill rotation enlargement unit 514 and an image decompression unit 515. The image reading unit 504 functions with respect to an object of a raster image type. The image decompression unit 515 decompresses raster image data of each tile stored in the image storage area 506. The flat fill rotation enlargement unit 514 rotates a tile of a flat fill portion among the raster image data decompressed by the image decompression unit 515, and enlarges the tile of the flat fill portion to a rendering resolution. A method for decompressing, rotating and enlarging the flat fill portion will be described below.

(Configuration of Rendering Unit 505)

The rendering unit 505 includes a fill drawing unit 516 and a job data evaluation unit 517. The job data evaluation unit 517 reads job data from the job data storage area 518, and performs a combining calculation to form a single fill node from a fill node group held in each of fill combining records. The fill combining record will be described below. The fill drawing unit 516 sets a value obtained from the combining calculation performed by the job data evaluation unit 517 as a raster pixel value in each pixel position of a fill region, and writes such a value into a storage area of a corresponding raster image. Such a process is performed on each of all the fill regions, so that a raster image is generated.

Figure 4:
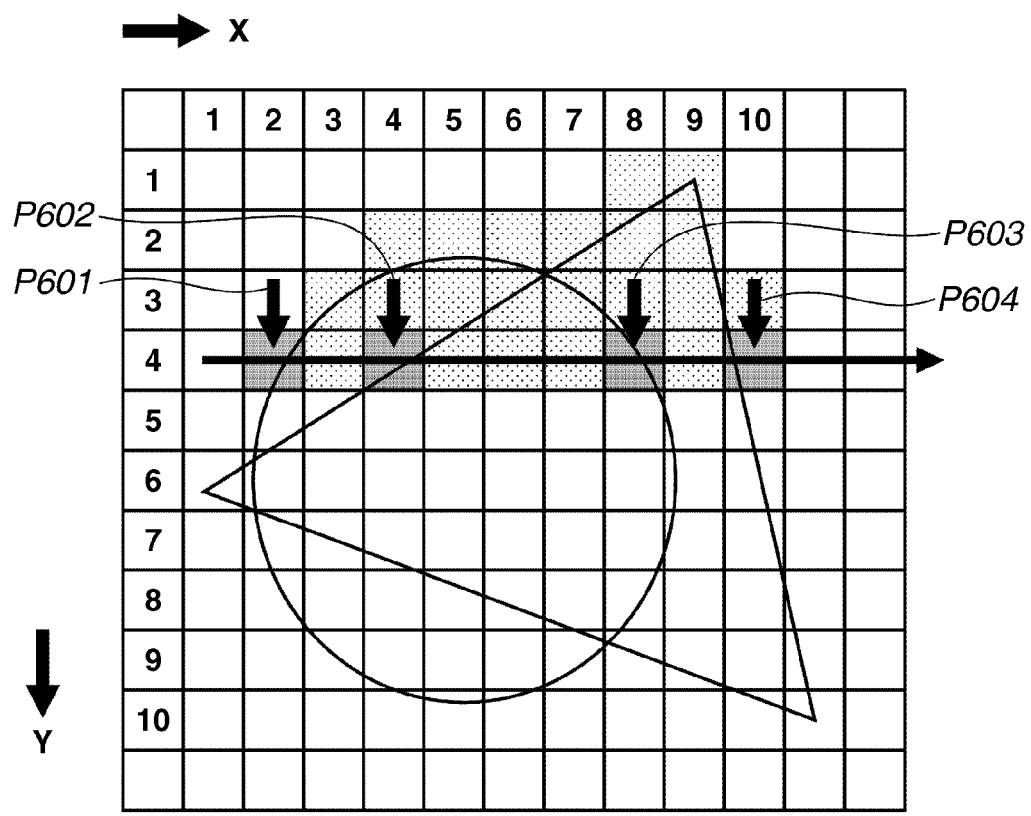
FIG. 4 is a diagram illustrating a situation of an object and a scanline (horizontal line).

Now, a job data generation process to be performed by the job data generation unit 503 is described in detail. In the present exemplary embodiment, a job data generation process represents a process for generating job data by extracting a contour point of an object by an edge detection process. FIG. 4 is a diagram illustrating a situation in which a scanline (horizontal line) intersects an object.

In FIG. 4, four contour points are extracted as indicated by arrows (fourth line). As illustrated in FIG. 4, an intersection point (pixel) of a scanline and an object serves as a contour point. In FIG. 4, intersection points P601, P602, P603, and P604 are extracted as contour points. As each of the contour points P602 and P603 illustrated in FIG. 4, a new contour point is extracted in a region in which objects overlap with each other. A process for extracting such a contour point is performed on each scanline within a drawing range (from first line to tenth line in FIG. 4), so that a region (fill region) partitioned by an object can be detected.

In FIG. 4, specifically, a fill region from a left end to the contour point P601 serves as a first fill region. A fill region from the contour point P601 to the contour point P602 serves as a second fill region, and another fill region from the contour point P602 to the contour point P603 serves as a third fill region. A fill region from the contour point P603 to the contour point P604 serves as a fourth fill region, and another fill region from the contour point P604 to a right end serves as a fifth fill region. Therefore, the fill regions are determined for each scanline.

Figure 5:
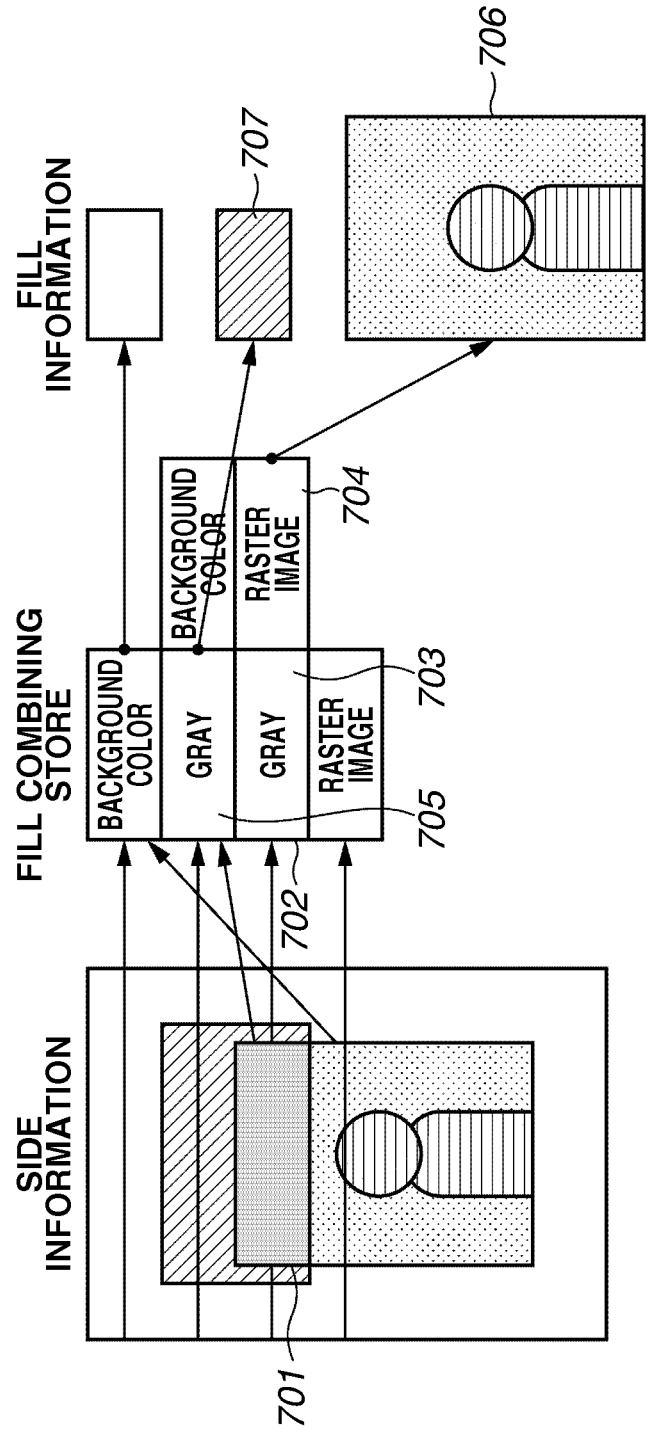
FIG. 5 is a diagram illustrating a structure of job data to be generated by a job data generation unit.

FIG. 5 is a diagram illustrating a structure of job data generated by the job data generation unit 503 illustrated in FIG. 3. In the present exemplary embodiment, the job data generation unit 503 generates job data by detecting an edge of drawing information of a drawing object generated by analyzing PDL data. As illustrated in FIG. 5, the job data includes side information, a fill combining store, and fill information. In image data illustrated in FIG. 5, a flat graphics object as a front image and an image object corresponding to a raster image as a background image overlap with each other in a transparent manner.

Now, side information is described in detail. In FIG. 4, coordinate values in a Y direction relative to the line and an X direction perpendicular to the Y direction are indicated by numerical values for the sake of description. The side information in job data includes information of the fill region. Specifically, information of a start position and an end position of a fill region in each of the Y coordinates is held in the side information. In FIG. 4, for example, a start position and an end position of the first fill region on a fourth line (Y coordinate is Y=4) are respectively held as 1 (X=1) and 2 (X=2) from a left end. In addition, a region from 1 (X=1) to 2 (X=2) on a third line is held as the first region. Accordingly, all the pixel positions in each fill region are specified. Moreover, each fill region in the side information refers to a record of a fill combining store (fill combining record) which will be described below.

In an example of FIG. 5, a fill region of side information 701 represents a fill region in which object elements of a flat graphic type and a raster image type overlap with each other. The fill region of the side information 701 refers to a fill combining record 702 illustrated in FIG. 5.

Next, the fill combining store illustrated in FIG. 5 is described in detail. The fill combining store includes a plurality of fill combining records 702. The fill combining record 702 includes one or a plurality of fill nodes. A fill record retains an overlapping order of objects within a corresponding fill region, in a stack. In the fill combining record 702 illustrated in FIG. 5, for example, since a gray graphic object is provided in the front relative to a raster image object, the gray graphic object is held in the front (left side). Each fill node refers to fill information.

The fill information illustrated in FIG. 5 is now described in detail. The fill information represents a fill method of side information. In other words, the fill information includes color data. When an object type is a flat graphics, the fill information is color data of a single color. When an object type is a raster image, the fill information is color data of the raster image stored in the image storage area 506. In an example of FIG. 5, a fill node 703 refers to color data 705 of gray, whereas a fill node 704 refers to raster image data 706.

Next, a detailed description is given of a process from tile division to image compression performed in the image storage unit 502. Specifically, input image data within PDL data is divided into tiles, and the divided tile is determined whether a tile attribute thereof is a lossless compression attribute or a lossy compression attribute. Then, a compression process is performed to generate intermediate data on a tile-by-tile basis. At that time, an enlargement prior to compression process is executed in step S806 in a flowchart illustrated in FIG. 6. When intermediate data to be held is decompressed, an enlargement subsequent to decompression process is performed on the data decompressed in step S1006 in a flowchart illustrated in FIG. 8, which will be described below.

Figure 6:
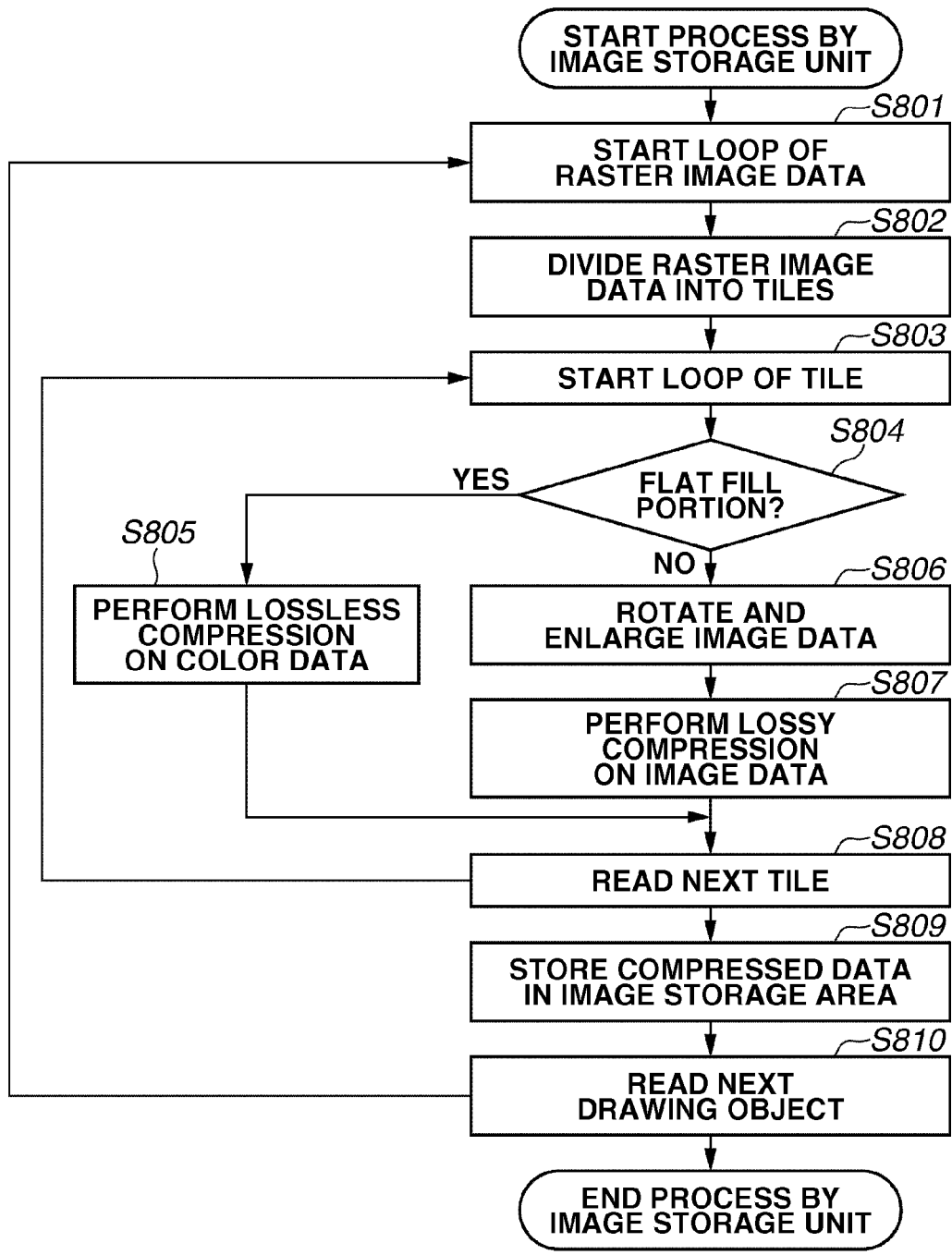
FIG. 6 is a flowchart illustrating an image processing method of the image processing apparatus.

FIG. 6 is a flowchart illustrating an image processing method of the image processing apparatus according to the present exemplary embodiment. This flowchart describes an example process from tile division to image compression to be performed by modules stored in the image storage unit 502 illustrated in FIG. 3. Such a process is executed on an object of a raster image type. Each of the steps is performed by execution of the corresponding module stored in the image storage unit 502 illustrated in FIG. 3 by the CPU of the image processing apparatus 300. In the following description, each module is primarily described. In the present exemplary embodiment, if a divided tile has one single color, such a region is referred to as a flat fill portion. On the other hand, a region in which each of adjacent pixels inside a divided tile has a different color value is referred to as a bitmap portion. In the present exemplary embodiment, an attribute of a tile region corresponding to a lossless compression method corresponds to the flat fill portion, whereas an attribute of a tile region corresponding to a lossy compression method corresponds to the bitmap portion. Hereinafter, a description is given of a process for determining whether a tile attribute of a divided tile is a flat fill portion or non-flat fill portion so that intermediate data is generated by a different compression process depending on the determination. In the present exemplary embodiment, moreover, in step S807, more specifically, at timing before the intermediate data is generated, a lossy compression process is performed on image data on which a rotation process or an enlargement process has been executed.

In step S801, the CPU reads any drawing object from a drawing region generated by the drawing object generation unit 501, and starts a loop of raster image data. In step S802, the tile dividing unit 507 divides the raster image data into tiles. When the raster image is divided (step S802), in step S803, the tile dividing unit 507 reads any tile and starts a loop of the tiles. In step S804, the image region determination unit 508 determines whether the tile read by the tile dividing unit 507 in step S803 is a flat fill portion.

If the image region determination unit 508 determines that the tile is a flat fill portion (YES in step S804), then in step S805, the image compression unit 511 performs lossless compression on color data according to a compression method selected by the compression method selection unit 509. Then, the operation proceeds to step S808.

Figure 7:
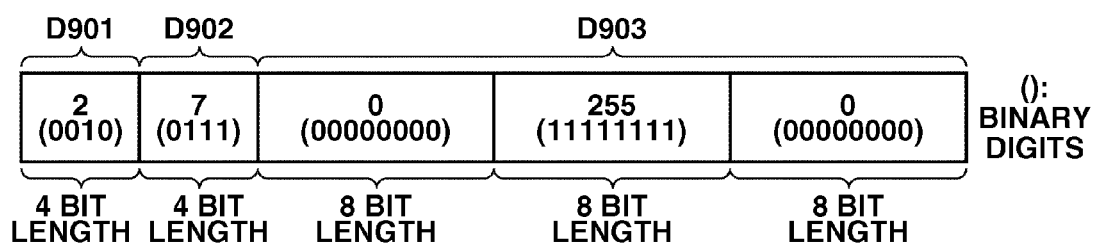
FIG. 7 is a diagram illustrating a data structure of raster image data.

In the present exemplary embodiment, color data is formatted in a variable length code. Such a format includes a value (4 bit length) obtained by subtracting 1 from the number of channels, a value (4 bit length) obtained by subtracting 1 from a bit length of a color value per channel, and color values (number of channels x bit length of color value) of respective channels. FIG. 7 is a diagram illustrating an example in which raster image data is a 24-bit red-green-blue (RGB) image (each of RGB is 8 bits), and a tile thereof is green in a single color. In the example illustrated in FIG. 7, a value obtained by subtracting 1 from the number of channels is 2 (D901), a value obtained by subtracting 1 from a bit length of a color value per channel is 7 (D902), and color values of respective channels are 0, 255, and 0 (D903).

If the image region determination unit 508 determines that the tile is not a flat fill portion (i.e., the tile is a bitmap portion in present exemplary embodiment) (NO in step S804), then in step S806, the bitmap rotation enlargement unit 510 rotates and enlarges the image data. In step S807, the image compression unit 511 performs lossy compression on the image data. In the present exemplary embodiment, the rotation and enlargement by the bitmap rotation enlargement unit 510 is performed using an affine transformation, and the lossy compression is performed by the image compression unit 511 using the JPEG as discussed above.

When step S805 or step S807 is finished, in step S808, the tile dividing unit 507 reads a next tile and starts a process from step S803. In step S808, when it is determined that reading of all the tiles is finished, the operation proceeds to step S809. In step S809, the image compression unit 511 stores the compressed data in the image storage area 506. Subsequently, in step S810, the CPU reads a next drawing object generated by the drawing object generation unit 501. In step S810, for example, when the drawing object generation unit 501 determines the presence of next raster image data, the operation starts from step S801. In step S810, on the other hand, when the drawing object generation unit 501 determines the absence of next raster image data, the operation ends.

Now, a detailed description is given of a process from decompression of an image to rotation and enlargement of a flat fill portion to be performed in the image reading unit 504.

Figure 8:
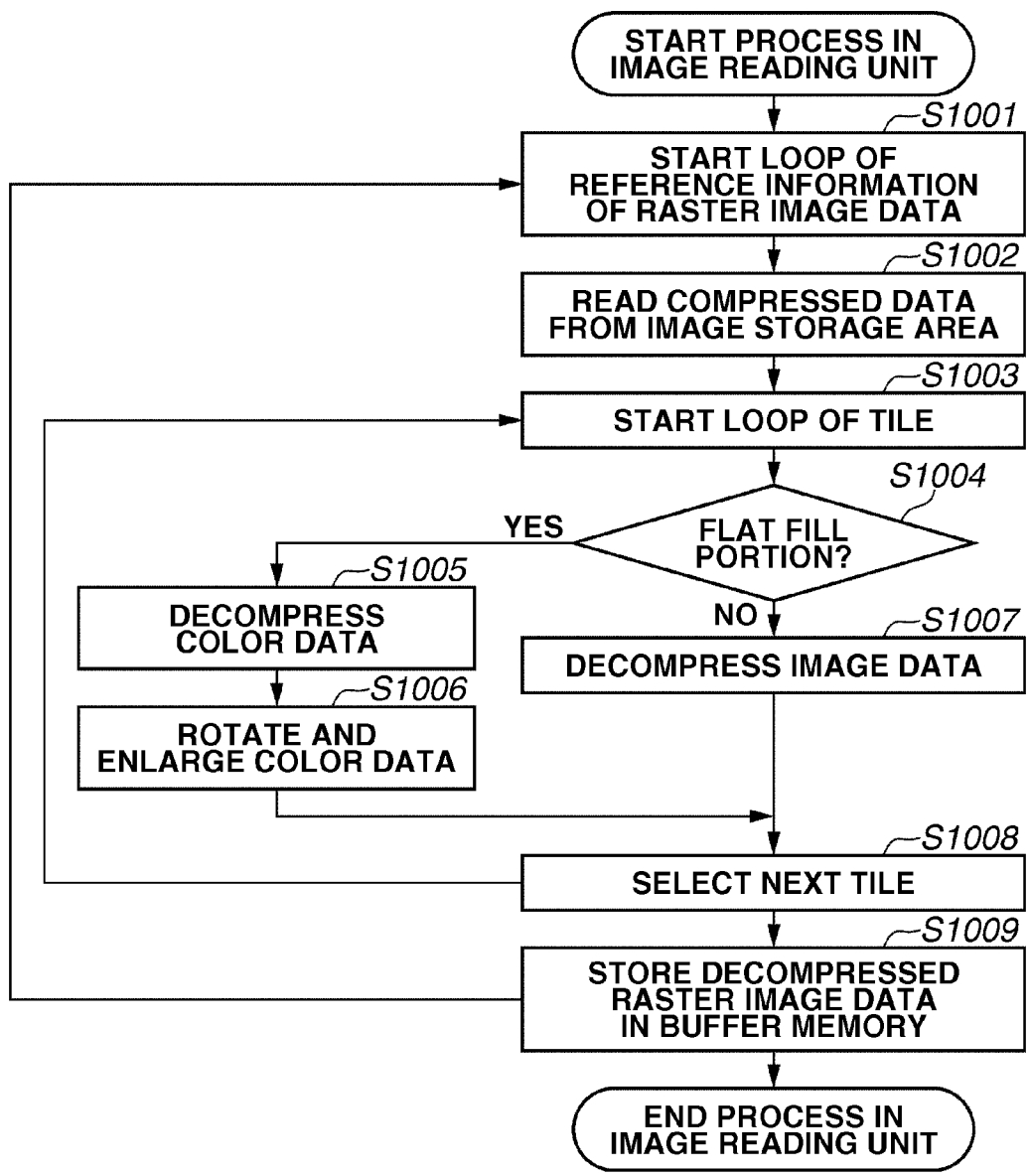
FIG. 8 is a flowchart illustrating an image processing method of the image processing apparatus.

FIG. 8 is a flowchart illustrating an image processing method of the image processing apparatus according to the present exemplary embodiment. This flowchart describes an example process from decompression of an image to rotation and enlargement of a flat fill portion to be performed by the image reading unit 504 illustrated in FIG. 3. Each of the steps is performed by the CPU of the image processing apparatus 300 executing the corresponding module in the image reading unit 504. In the following description, each module is primarily described. According to the present exemplary embodiment, moreover, in step S1006, in other words, at timing after intermediate data is decompressed, a rotation or enlargement process is executed on the intermediate data.

In step S1001, the image reading unit 504 selects a raster image data within a drawing region based on job data, and refers to reference information of the selected raster image data to start a loop. In the present exemplary embodiment, the reference information is an address of compressed data of the raster image data inside the image storage area 506. In step S1002, the image reading unit 504 reads the compressed data of the raster image data based on the reference information from the image storage area 506. When the compressed data is read (step S1002), in step S1003, the image decompression unit 515 selects any tile to start a loop. In step S1004, the image reading unit 504 determines whether the tile selected in step S1003 is a flat fill portion.

If the image reading unit 504 determines that the selected tile is not a flat fill portion (NO in step S1004), in other words, the selected tile is a bitmap portion, then in step S1007, the image decompression unit 515 decompresses the bitmap portion. In the present exemplary embodiment, decompression is performed using a decompression algorithm of the JPEG method. Herein, the decompressed raster image data is rasterized in the corresponding tile region in a buffer memory for temporarily storing the decompressed raster image data.

If the image reading unit 504 determines that the selected tile is a flat fill portion (YES in step S1004), then in step S1005, the image decompression unit 515 decompresses color data. Specifically, the image decompression unit 515 decodes a lossless compression code of the color data, and obtains a color value of each channel. In the example of FIG. 7, the image decompression unit 515 reads first 4 bits, and thus it becomes known that the number of channel is 3. Subsequently, the image decompression unit 515 reads next 4 bits, and it becomes known that a color value per channel has a bit length of 8. The image decompression unit 515 reads every 8 bits for 3 channels, and obtains 24-bit RGB value of "0, 255, 0". When the image decompression unit 515 finishes the decompression of the color data in S1005, the operation proceeds to step S1006.

In step S1006, the flat fill rotation enlargement unit 514 rotates and enlarges the color data. Specifically, the flat fill rotation enlargement unit 514 duplicates the color data decompressed by the image decompression unit 515 on the tile region in the buffer memory for temporarily storing the decompressed raster image data, and fills the data.

When step S1006 or S1007 is finished, the operation proceeds to step S1008. In step S1008, the image reading unit 504 selects a next tile, and then the operation is repeated from S1003. If all the tiles are processed (step S1008), then in step S1009, the image reading unit 504 stores the decompressed raster image data for all the tiles of the raster image data within the drawing region in the buffer memory, and the operation ends.

Figure 9:
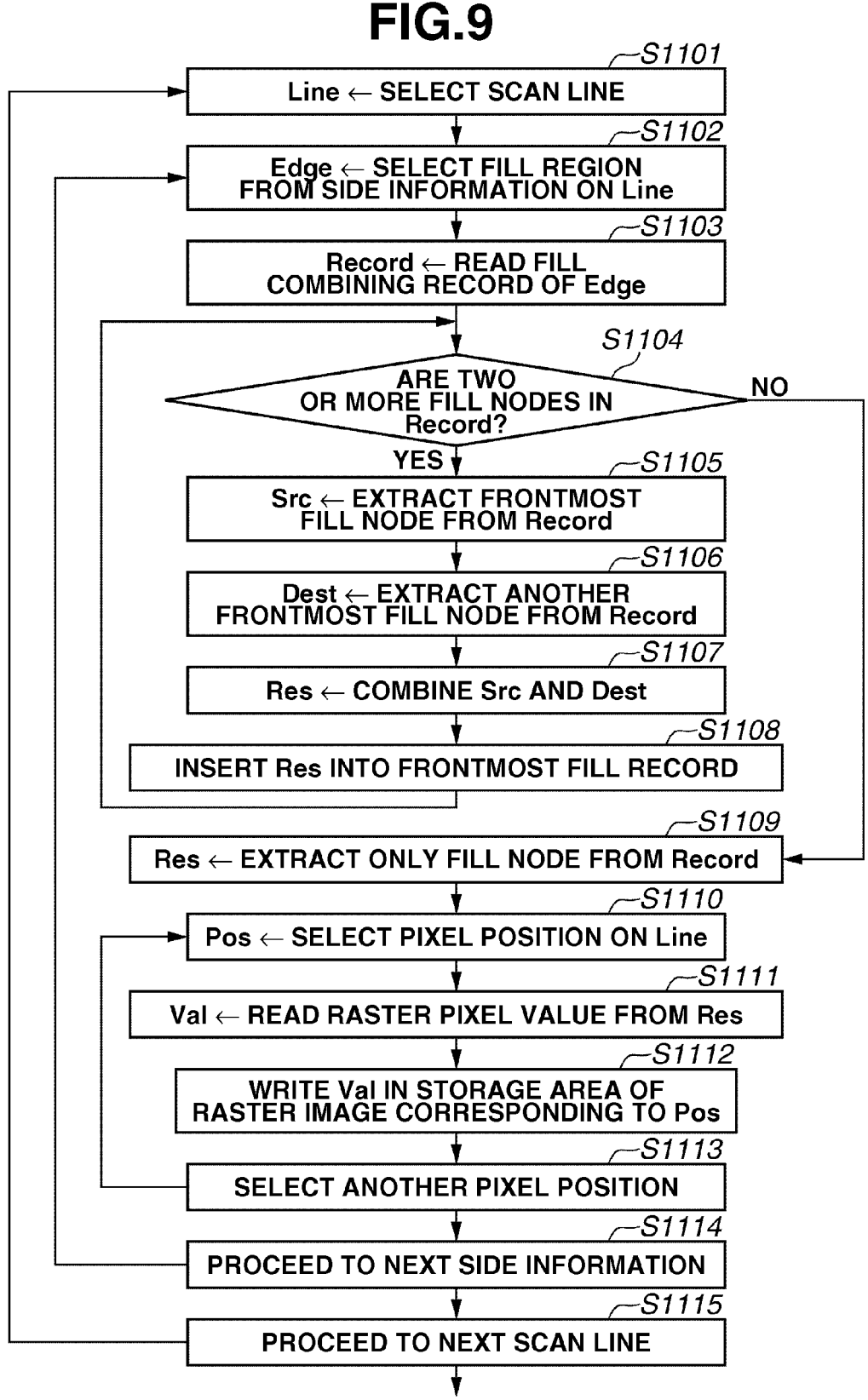
FIG. 9 is another flowchart illustrating an image processing method of the image processing apparatus.

Next, a description is given of a rendering process to be performed by the rendering unit 505. FIG. 9 is a flowchart illustrating an image processing method of the image processing apparatus according the present exemplary embodiment. This flowchart describes an example of the rendering process discussed in step S403 illustrated in FIG. 2. Each of the steps is performed by the CPU of the image processing apparatus 300 executing the corresponding module in the rendering unit 505. In the following description, each module is primarily described.

In step S1101, the job data evaluation unit 517 selects one scanline from a drawing range, and substitutes the selected scanline into Line. Herein, the raster image data within the drawing range is already decompressed by the image reading unit 504. In step S1102, the job data evaluation unit 517 selects one fill region from side information on Line, and substitutes the selected region into Edge.

When the fill region is selected (substituted into Edge) (step S1002), in step S1103, the job data evaluation unit 517 reads into Record a fill combining record referred to regarding a fill region. In step S1104, the job data evaluation unit 517 determines whether two or more fill nodes remain in the fill combining record read in step S1103. If the job data evaluation unit 517 determines that two or more fill nodes remain in the fill combining record (YES in step S1104), then in step S1105, the job data evaluation unit 517 extracts a frontmost fill node from Record, and substitutes the frontmost fill node into a variable Src.

When the frontmost fill node is substituted into the variable Src (step S1105), in step S1106, the job data evaluation unit 517 extracts another frontmost fill node from the variable Record, and substitutes the frontmost fill node into a variable Dest. When the frontmost fill node is substituted into the variable Dest (S1106), in step S1107, the job data evaluation unit 517 combines the variable Src and the Variable Dest, and generates the combined fill node as a combined result Res. In step S1108, the job data evaluation unit 517 inserts the combined results Res into a frontmost fill record, and then the operation returns to step S1104.

If the job data evaluation unit 517 determines that two or more fill nodes do not remain in the fill combining record (NO in step S1104), the operation proceeds to step S1109. If only one fill node remains, this fill node serves as a final combined result.

Subsequently, in step S1110, the fill drawing unit 516 selects one pixel position from the variable Line within the fill region, and substitutes the selected pixel position into a variable Pos. When the pixel position is selected by the fill drawing unit 516 (substituted into Pos) (step S1110), in step S1111, the fill drawing unit 516 reads a raster pixel value in the selected pixel position from the combined result Res, and substitutes the raster pixel value into a variable Val. Herein, if the combined result Res refers to single color fill information, color data for such a single color is substituted into the variable Val. If the combined result Res refers to raster image fill information, color data of a pixel position is read from raster image data and is substituted into the variable Val.

When the combined result Res is substituted into the variable Val in step S1111, in S1112, the fill drawing unit 516 writes a value of the variable Val in a storage area of the raster image so that a pixel value of the raster image corresponding to the variable Pos becomes the variable Val.

Subsequently, in step S1113, the fill drawing unit 516 selects another pixel position from Line within the fill region. Upon selection of another pixel position, the fill drawing unit 516 starts the process from step S1110 again. If the fill drawing unit 516 determines that the writing of the raster pixel values is finished for all the pixel positions on Line within the fill region (step S1113), then in step S1114, the fill drawing unit 516 proceeds to next side information. When the fill drawing unit 516 determines that the process is finished for all the fill regions on the variable Line (step S1114), in step S1115, the operation proceeds to a next scanline. Accordingly, all of the scanlines are processed, so that the rendering process in the drawing range is completed, in other words, the raster image is generated.

According to the present exemplary embodiment, therefore, a raster image is divided into a tile of a flat fill portion and a tile of a bitmap portion. The tile of the flat fill portion undergoes lossless compression and then an enlargement process. On the other hand, the tile of the bitmap portion undergoes an enlargement process and then lossy compression. The present exemplary embodiment, therefore, can prevent amplification of noise deteriorating image quality caused by the enlargement subsequent to the lossy compression while reducing a size of compressed data.

A second exemplary embodiment is now described. In the first exemplary embodiment, raster image data is divided into tiles, and an image process is performed based on the determination of whether the tile is a bitmap portion or a flat fill portion. According to the second exemplary embodiment, on the other hand, each tile is segmented into a bitmap portion and a flat fill portion, and then an image process is performed.

Figure 10:
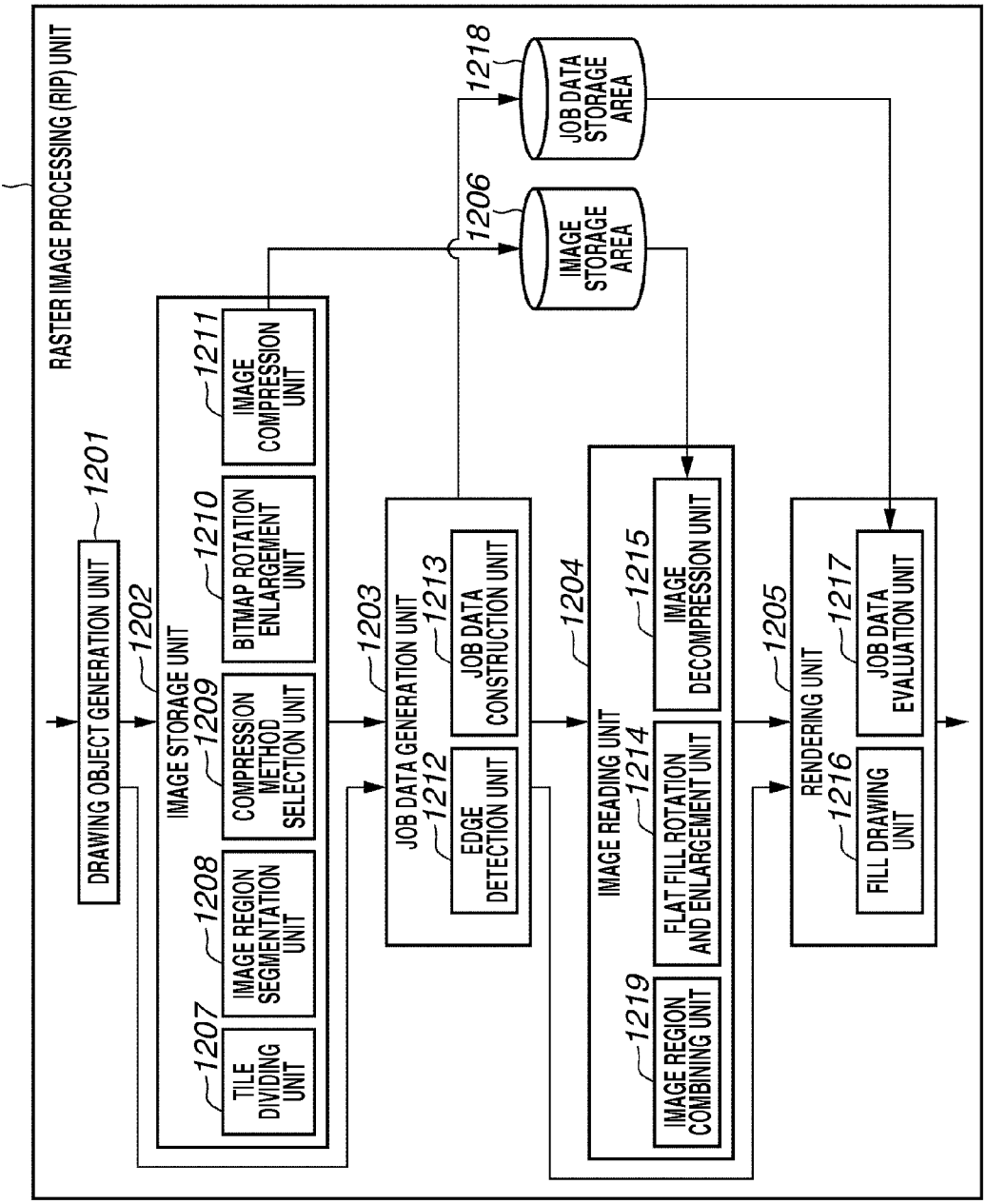
FIG. 10 is a block diagram illustrating a configuration of an image processing apparatus.

A description is first given of a raster image processing (RIP) unit 1200. FIG. 10 illustrates a configuration of an image processing apparatus according to the present exemplary embodiment. The raster image processing unit 1200 illustrated in FIG. 10 is similar to the raster image processing unit 303 illustrated in FIG. 3 except for an image region segmentation unit 1208 and an image region combining unit 1219. The image region segmentation unit 1208 is disposed in an image storage unit 1202 instead of the image region determination unit 508 illustrated in FIG. 3, and the image region combining unit 1219 is added to an image reading unit 1204. Components 1201 through 1207 and 1209 through 1218 illustrated in FIG. 10 function substantially similar to the respective components 501 through 507 and 509 through 518 illustrated in FIG. 3, and the descriptions thereof are omitted.

In FIG. 10, the image region segmentation unit 1208 is a module for segmenting each tile into a bitmap portion and a flat fill portion. The image region combining unit 1219 is a module for combining the segmented bitmap portion and flat fill portion, so that these portions are restored into a tile shape. Similar to the first exemplary embodiment, a CPU included in an image processing apparatus 300 executes the modules corresponding to the image region segmentation unit 1208 and the image region combining unit 1219, so that an image process according to the present exemplary embodiment is performed.

Figure 11:
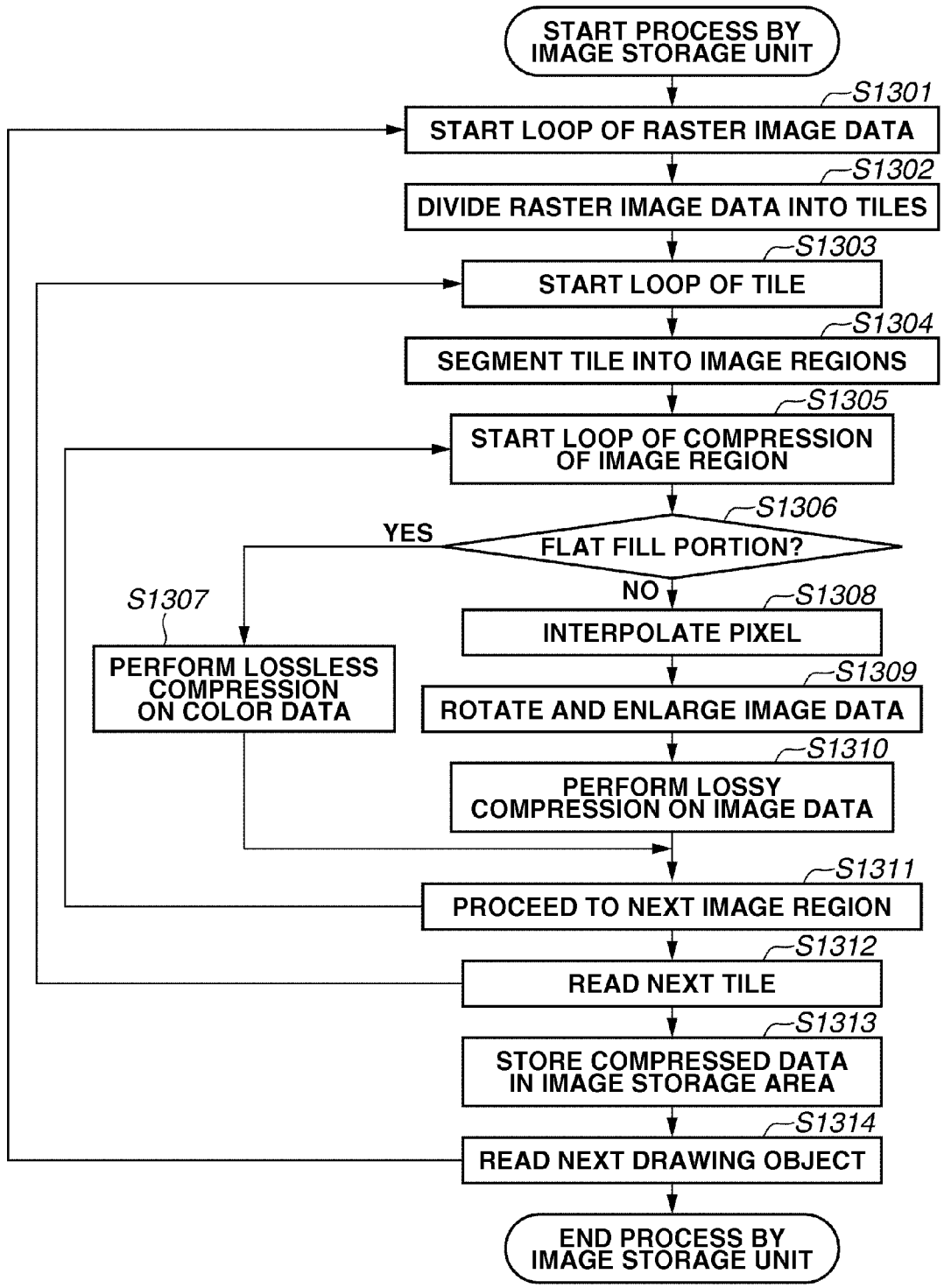
FIG. 11 is a flowchart illustrating an image processing method of the image processing apparatus.

FIG. 11 is a flowchart illustrating an image processing method of the image processing apparatus according to the present exemplary embodiment. This flowchart describes an example process from tile division to image compression to be performed by respective modules stored in the image storage unit 1202 illustrated in FIG. 10. Each of the steps is performed by the CPU of the image processing apparatus 300 executing the corresponding module.

Although the flowchart illustrated in FIG. 11 is similar to that illustrated in FIG. 6 of the first exemplary embodiment, a segmentation process is added to the flowchart in FIG. 11. In step S1304, the image region segmentation unit 1208 performs a segmentation process for each tile. With this additional process of step S1304, a compression loop in steps S1305 and S1311 and a pixel interpolation process in step S1308 are added. In the loop in steps 1305 and 1311, the compression process is performed according to a determination result of whether each image region is a flat fill portion. In step S1308, a pixel is interpolated in an image region determined as non-flat fill portion. Specifically, input image data within the PDL data is segmented into image regions, and it is determined whether the segmented image region is to be lossless-compressed or lossy-compressed. Then, a compression process is performed to generate intermediate data for each region. At this time, in step S1309, an enlargement prior to compression process is executed. In addition, when the intermediate data being held is decompressed, an enlargement is performed subsequent to decompression process on the data decompressed in step S1407 in a flowchart illustrated in FIG. 12 described below.

Figure 12:
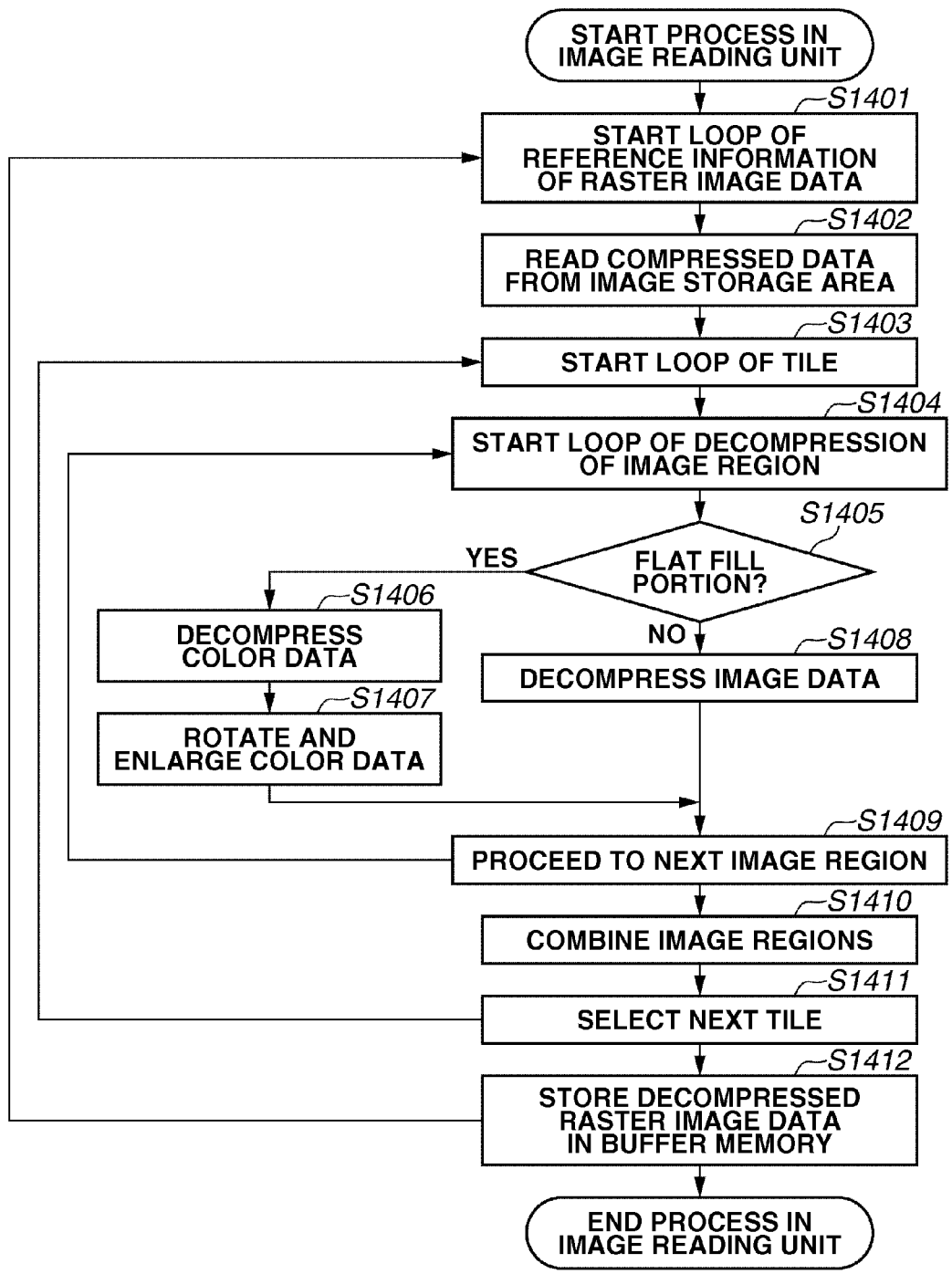
FIG. 12 is another flowchart illustrating an image processing method of the image processing apparatus.

FIG. 12 is a flowchart illustrating an image processing method of the image processing apparatus according to the present exemplary embodiment. This flowchart describes an example process from decompression of an image to rotation and enlargement of a flat fill portion to be performed by the image reading unit 1204. The flowchart illustrated in FIG. 12 according to the present exemplary embodiment is similar to that illustrated in FIG. 8 according to the first exemplary embodiment except for additional decompression process loop in steps S1404 and S1409, and a combining process in S1410. In step S1404 and S1409, a decompression process is performed for each image region based on a determination result of whether the image region is a flat fill portion. In step S1410, image regions are combined.

Next, a detailed description is given of a process of image region segmentation to be performed by the image region segmentation unit 1208. The segmentation process starts with reading of a raster image on a line-by-line basis. Assume that the image region segmentation unit 1208 reads an image on a line-by-line basis relative to a main scanning direction of the image processing apparatus 300.

Figure 13:
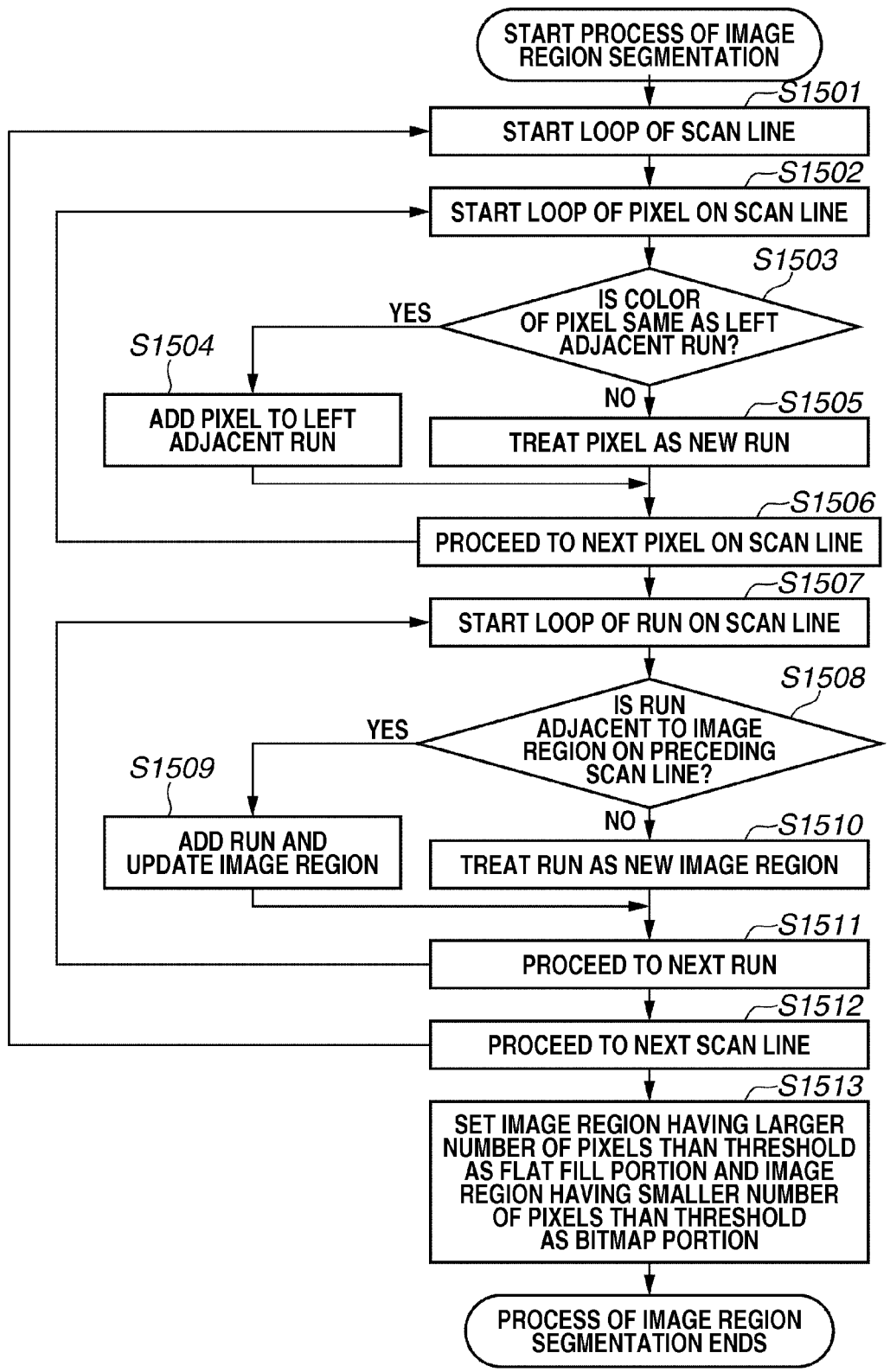
FIG. 13 is a flowchart illustrating an image processing method of the image processing apparatus.

FIG. 13 is a flowchart illustrating an image processing method of the image processing apparatus according to the present exemplary embodiment. This flowchart describes an example process of an image region segmentation to be performed by the image region segmentation unit 1208 illustrated in FIG. 10.

In step S1501, the image region segmentation unit 1208 reads any scanline, and starts a loop of scanlines. When the scanline is read (step S1501), in step S1502, the image region segmentation unit 1208 reads a pixel at a left end of the scanline, and starts a loop of pixels. When the pixels at the left end of the scanline is read (step S1502), in step S1503, the image region segmentation unit 1208 determines whether the read pixel and a left adjacent run are in the same color. If the image region segmentation unit 1208 determines that the pixel and the left adjacent run are in the same color (YES in step S1503), then in step S1504, the read pixel is added to the left adjacent run. If the pixel and the left adjacent run are not in the same color (including a situation where the read pixel is the leftmost pixel on the scanline) (NO in step S1503), then in step S1505, the image region segmentation unit 1208 treats the read pixel as a new run.

When step S1504 or S1505 is finished, in step S1506, the image region segmentation unit 1208 proceeds to a process of a next pixel from the read pixel. The image region segmentation unit 1208 reads color data of the next pixel and starts a process of the next pixel from step S1502. In step S1506, when all of the pixels on the read scanline are processed by the image region segmentation unit 1208 in step S1504 or S1505, the operation proceeds to step S1507.

In step S1507, the image region segmentation unit 1208 reads any run on the read scanline, and starts a loop of runs. In step S1508, the image region segmentation unit 1208 determines whether a run having the same color as the read run is present on a just preceding scanline and is adjacent to the read run. If these two runs are adjacent to each other (YES in step S1508), then in step S1509, the image region segmentation unit 1208 adds the read run to the preceding scanline and updates an image region.

If the image region segmentation unit 1208 determines that the runs are not adjacent to each other (NO in step S1508), then in step S1510, the image region segmentation unit 1208 treats the read run as a new image region. When step S1509 or S1510 is finished, in step S1511, the image region segmentation unit 1208 proceeds to a process on a next run from the read run. The image region segmentation unit 1208 reads color data in the next run, and starts a process from step S1507. In step S1511, when all of the runs on the read scanline are processed by the image region segmentation unit 1208 in step S1510 or S1509, the operation proceeds to step S1512.

In step S1512, the image region segmentation unit 1208 proceeds to a process on a next scanline from the read scanline. The image region segmentation unit 1208 reads the next scanline (step S1512), and the operation starts from step S1501. If all of the scanlines in the raster image are read by the image region segmentation unit 1208 (step S1512), then in step S1513, the image region segmentation unit 1208 counts the number of pixels in each image region of the raster image. If an image region has the number of pixels that exceeds a threshold, the image region segmentation unit 1208 sets this image region as a flat fill portion. If an image region has the number of pixels that does not exceed the threshold, the image region segmentation unit 1208 sets this image region as a bitmap portion. The image region segmentation process is performed accordingly.

A compression method for each image region is now described. A compression method selection unit 1209 selects an appropriate compression method for each image region. In the present exemplary embodiment, pixel interpolation and the JPEG are selected as a compression method for an image region of a bitmap portion. A compression method for a flat fill portion will be described below.

Figure 14:
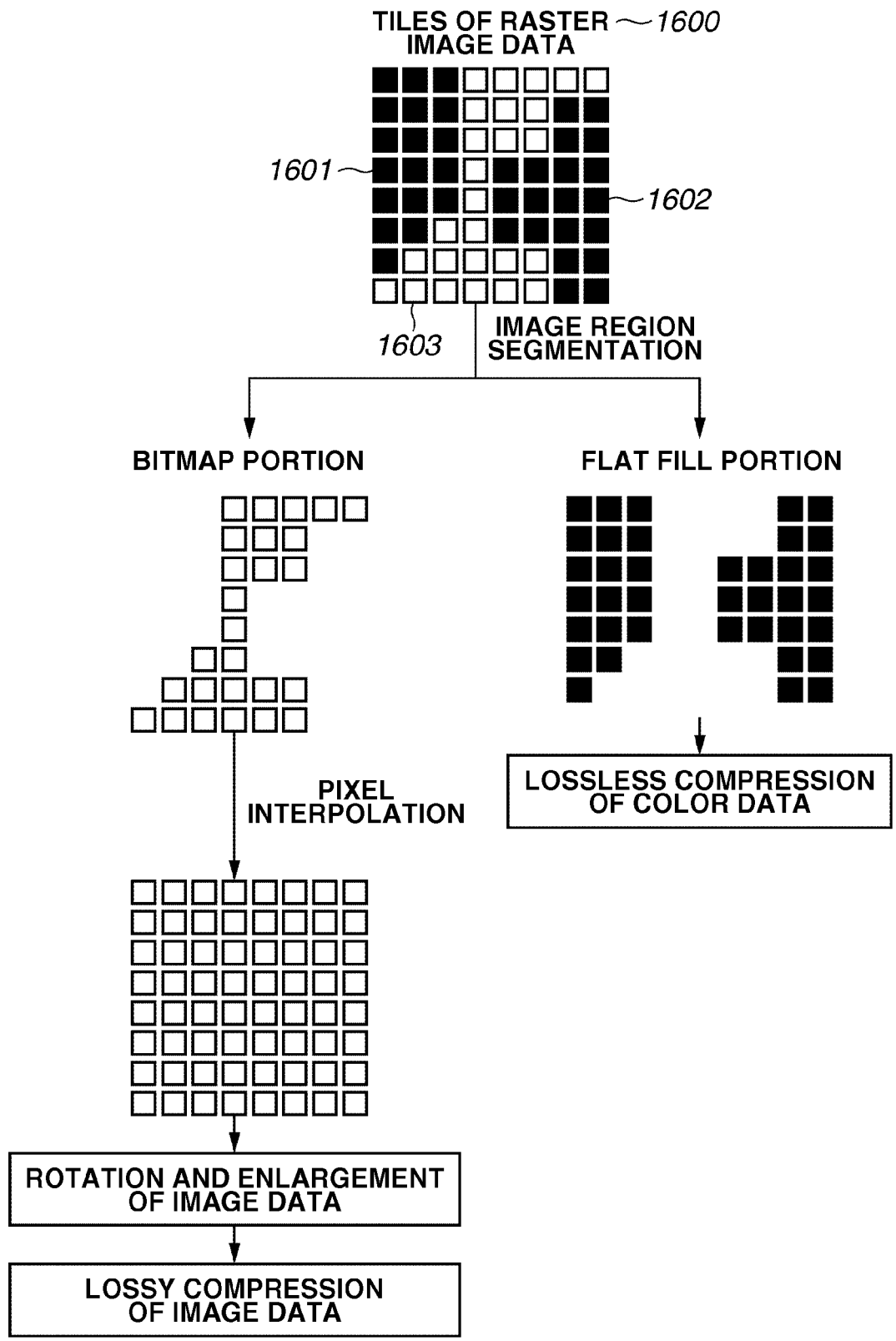
FIG. 14 is a diagram illustrating an example of pixel interpolation in the image processing apparatus.

FIG. 14 is a diagram illustrating an example of pixel interpolation in the image processing apparatus according to the present exemplary embodiment. In FIG. 14, a tile 1600 of raster image data is segmented into image regions of a flat fill portion 1601 and a bit map portion 1603. Herein, the bit map portion 1603 is formed in a tile shape by interpolation of a pixel region segmented as a flat fill portion.

Next, pixel interpolation of the bit map portion 1603 is described in detail. The pixel interpolation starts with reading of a tile of a raster image on a line-by-line basis.

Figure 15:
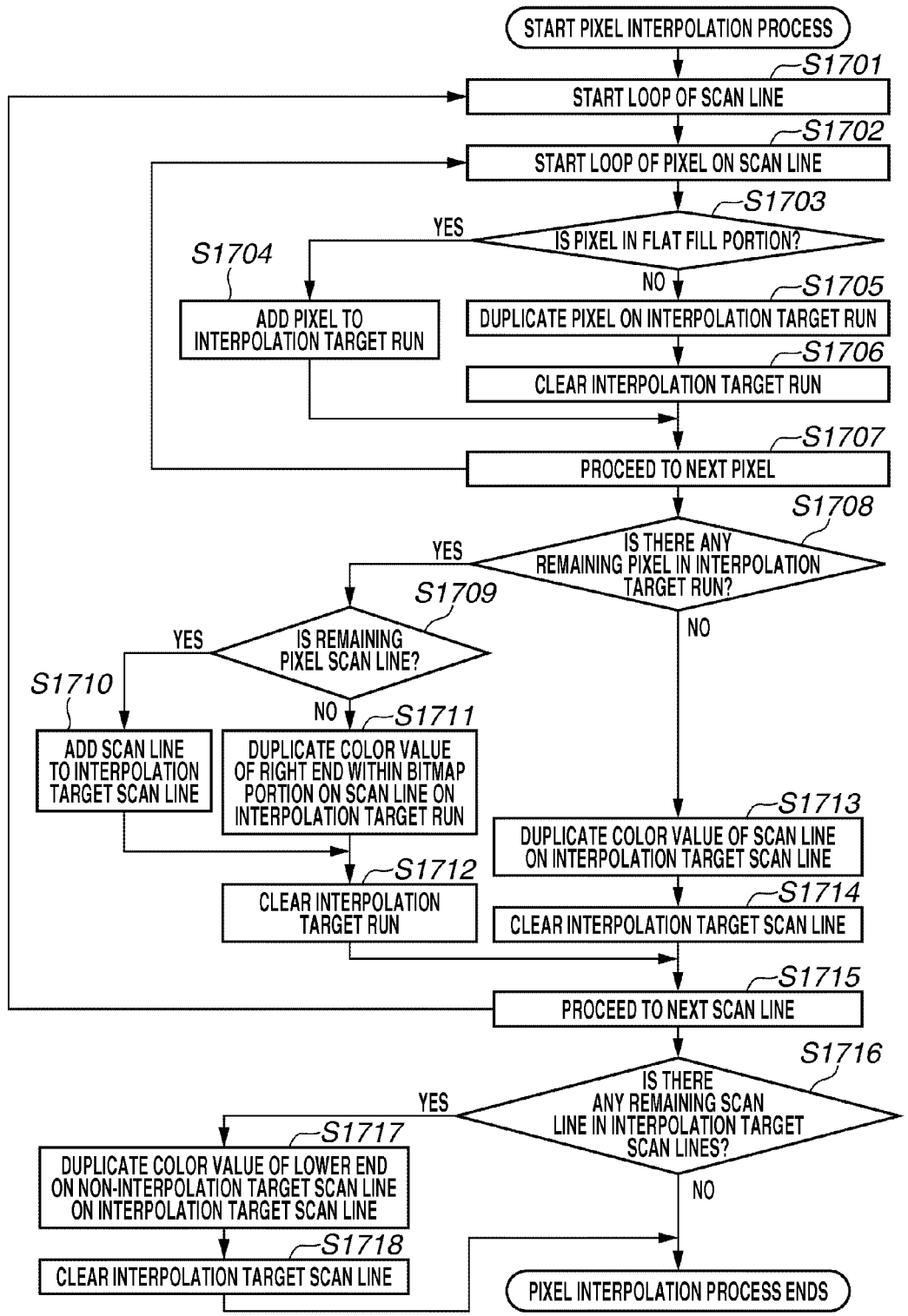
FIG. 15 is a flowchart illustrating an image processing method of the image processing apparatus.
Figure 17A:
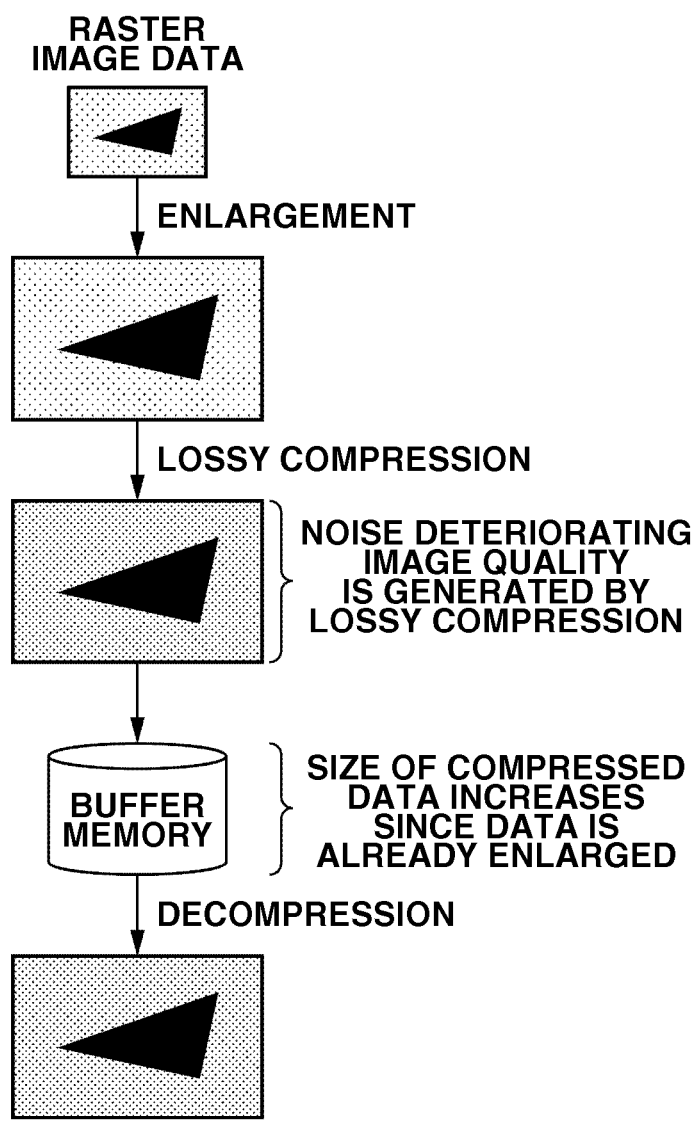
FIGS. 17A and 17B are diagrams illustrating examples of conventional processes each including compression, decompression and enlargement.
Figure 17B:
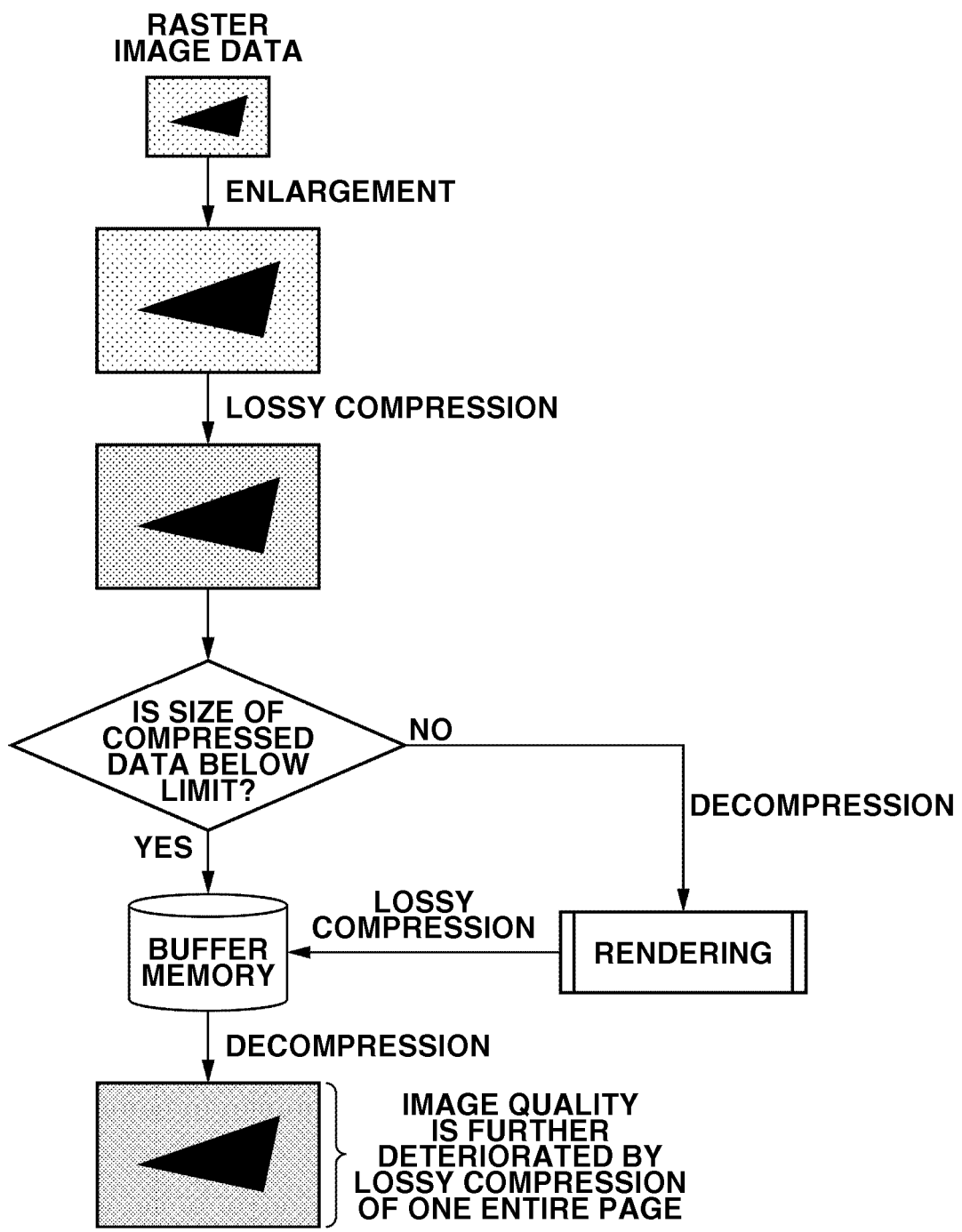
Figure 18:
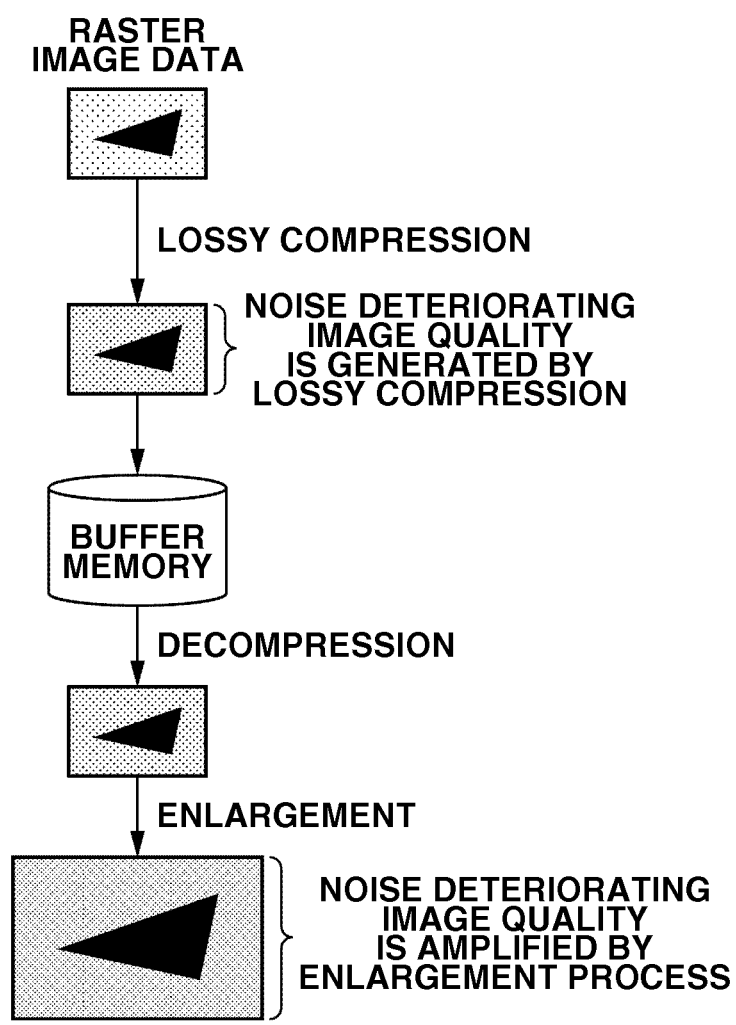
FIG. 18 is a diagram illustrating an example of a conventional process including compression, decompression, and enlargement.

FIG. 15 is a flowchart illustrating an image processing method of the image processing apparatus according to the present exemplary embodiment. The flowchart describes an example of a pixel interpolation process illustrated in FIG. 14 which is performed by an image compression unit 1211.

In step S1701, the image compression unit 1211 reads any scanline and starts a loop of scanlines. When the scanline is read (step S1701), in step S1702, the image compression unit 1211 reads a pixel at a left end of the scanline, and starts a loop of pixels. When the pixel at the left end of the scanline is read (step S1702), in step S1703, the image compression unit 1211 determines whether the read pixel belongs to a flat fill portion.

If the image compression unit 1211 determines that the read pixel belongs to the flat fill portion (YES in step S1703), then in step S1704, the image compression unit 1211 adds the read pixel to an interpolation target run. If the read pixel does not belong to the flat fill portion (NO in step S1703), then in step S1705, the image compression unit 1211 duplicates the read pixel on the interpolation target run. Subsequently, in step S1706, the image compression unit 1211 clears the interpolation target run.

When step S1704 or S1706 is finished, in step S1707, the image compression unit 1211 proceeds to a process of a next pixel from the read pixel. The image compression unit 1211 reads color data of the next pixel, and starts a process from step S1702. In step S1707, when all of the pixels on the read scanline are processed by the image compression unit 1211 in step S1704 or S1706, the operation proceeds to step S1708.

In step S1708, the image compression unit 1211 determines whether there is any remaining pixel in the interpolation target run. If there is a remaining pixel (YES in step S1708), then in step S1709, the image compression unit 1211 determines whether the remaining pixel is a scanline.

If the image compression unit 1211 determines that the remaining pixel is a scanline (YES in step S1709), in other words, the entire read scanline belongs to a flat fill portion, then in step S1710, the image compression unit 1211 adds the read scanline to a interpolation target scanline. If the remaining pixel is not a scanline (NO in step S1709), in other words, a right end portion of the read scanline belongs to a flat fill portion, then in step S1711, the image compression unit 1211 duplicates a color value at a right end within the bitmap portion on the read scanline, on an interpolation target run.

When step S1710 or S1711 is finished, in step S1712, the image compression unit 1211 clears the interpolation target run. If the the image compression unit 1211 determines that there is not any remaining pixel (NO in step S1708), in other words, the entire read scanline belongs to a bitmap portion, or interpolation is completed, then in step S1713, the image compression unit 1211 duplicates a color value of the scanline on the interpolation target scanline. Subsequently, in step S1714, the image compression unit 1211 clears the interpolation target scanline.

When step S1712 or S1714 is finished, in step S1715, the image compression unit 1211 proceeds to a next scanline from the read scanline. Accordingly, the image compression unit 1211 reads color data in the next scanline, and starts a process from S1701. In step S1715, when all of the scanlines inside the tile are processed by the image compression unit 1211 in step S1712 or S1714, the operation proceeds to step S1716.

In step S1716, the image compression unit 1211 determines whether there is any remaining scanline in the interpolation target scanlines. If there is a remaining scanline (YES in step S1716), then in step S1717, the image compression unit 1211 duplicates a color value of a lower end scanline among non-interpolation target scanlines on the interpolation target scanline (i.e., entire scanline belongs to a bitmap portion, or interpolation is completed). When step S1717 is finished, in step S1718, the image compression unit 1211 clears the interpolation target scanline. When step S1718 is finished, or if the image compression unit 1211 determines that there is not any remaining scanline (NO in step S1716), the image compression unit 1211 completes the pixel interpolation process.

Next, a compression process of a flat fill portion is described. In the present exemplary embodiment, each image region of a flat fill portion is subjected to the lossless compression with respect to coordinate information and color data. The coordinate information includes a start position and an end position of an image region in each of Y coordinates similar to the information of the fill region information of the side information. The coordinate information is coded into a variable length code by Huffman coding. The color data is formatted into a variable length similar to the present exemplary embodiment.

Now, a decompression method for each image region is described. An image region of a bitmap portion is decompressed by JPEG. In each image region of a flat fill portion, coordinate information is decoded by Huffman coding, and color data is decoded by the same method as the present exemplary embodiment.

Each image region of the decompressed flat fill portion is rotated and enlarged by a flat fill rotation enlargement 1214. In the present exemplary embodiment, each image region of the decompressed flat fill portion is rotated and enlarged using an affine transformation, and each coordinate information is updated.

Next, a description is given of an image region combining process to be performed by the image region combining unit 1219. For each tile, the image region combining unit 1219 combines a decompressed bitmap portion and a flat fill portion that is rotated and enlarged after decompression, so that a tile shape is restored. In the present exemplary embodiment, the image region combining process is performed by overwriting with pixels of the flat fill portion, the bitmap portion already formed into a shape similar to a tile by the pixel interpolation.

Specifically, the image region combining process is performed as follows. When a decompression process is executed on a bitmap portion, decompressed raster image data is rasterized in a corresponding region in a buffer memory for temporarily storing therein the decompressed raster image. Then, the image region combining unit 1219 overwrites each image region of a flat fill portion subjected to rotation and enlargement, with the corresponding color data, and duplicates each image region on the relevant tile region in the buffer memory, to which each coordinate information corresponds.

According to the present exemplary embodiment, therefore, each tile of a raster image is segmented into an image region of a flat fill portion and an image region of a bitmap portion, so that amplification of noise deteriorating image quality caused by enlargement after lossy compression can be prevented, and a size of compressed data can be reduced.

A third exemplary embodiment is now described. In the present exemplary embodiment, as to an image region determined as a bitmap portion, it is determined again whether the image region is a flat fill portion or a bitmap portion.

In one example, if an image region determined as a bitmap portion has the number of pixels that is less than a threshold, the image region is corrected and determined as a flat fill portion.

In another example, an image region determined as a bitmap portion is compressed by both of a compression method for a flat fill portion and a compression method for a bitmap portion including rotation and enlargement. Then, a determination is made again by selecting any of a flat fill portion or a bitmap portion that has the compressed data of smaller size. Such re-determination enhances image quality and further reduces compressed data size.

A fourth exemplary embodiment is now described. In the present exemplary embodiment, if an enlargement rate of raster image data is smaller than 1 in the first through third exemplary embodiments, in other words, if raster image data is reduced, a reduction process is performed before tile division.

FIG. 16 is a flowchart illustrating an image processing method of an image processing apparatus according to the present exemplary embodiment. This flowchart describes an example process from tile division to image compression. Hereinafter, steps that differ from those of the second exemplary embodiment are described.

In step S1802, an enlargement rate of raster image data is determined whether the rate is smaller than 1 before tile division is performed. If the enlargement rate is smaller than 1 (YES in step S1802), then in step S1803, a process in which the image data is rotated and reduced, is added.

After the tile division, in step S1811, a compression method selection unit 1209 determines whether an enlargement rate of the raster image data is greater than 1 in the image region determined as a non-flat fill portion by the image region segmentation unit 1208. Unlike the second exemplary embodiment, only if the enlargement rate is greater than 1 (YES in step S1811), then in step S1812, a bitmap rotation enlargement unit 1210 rotates and enlarges the image data.

According to the fourth exemplary embodiment, therefore, an image processing method is changed such that a reduction process is performed before a tile division process according to an enlargement rate of raster image regardless of whether it is the flat fill portion or bitmap portion, thereby further reducing a size of compressed data.

Other Embodiments

A process for compressing a bitmap portion according to the first and second exemplary embodiments may be executed as follows.

Compressed data is generated by lossy compression after enlargement (such compressed data is hereinafter called as enlarged compressed data). Another compressed data is generated by lossy compression without enlargement (such compressed data is hereinafter called as non-enlarged compressed data). Both of the enlarged compressed data and the non-enlarged compressed data are stored in the image storage area 506 (the image storage area 1206 in the second exemplary embodiment).

Accordingly, a compression process is performed on raster image data, and job data is generated by the job data generation unit 503 (the image data generation unit 1203 in the second exemplary embodiment). Herein, if a buffer memory including the image storage area 506 (the image storage area 1206 in the second exemplary embodiment) exceeds a predetermined memory limit, the enlarged compressed data is deleted, so that the non-enlarged compressed data is determined as compressed data of a bitmap portion. If the buffer memory does not exceed the predetermined memory limit at the time of completion of all the the compression processes and the job generation processes, the non-enlarged compressed data is deleted, so that the enlarged compressed data is determined as compressed data of a bitmap portion.

Therefore, a case can be prevented where a buffer memory exceeds a predetermined memory limit caused by changing a compression process such that an enlargement process is performed before lossy compression in a bitmap portion, according to the first and second exemplary embodiments.

The present invention can be applied to a printer or a display device, and an image output device.

Each process of the present invention can be performed by execution of software (program) obtained through a network or various storage media by a processing device (CPU, processor) of a personal computer (computer), for example.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-108580 filed May 13, 2011, which is hereby incorporated by reference herein in its entirety.

What is claimed is:

1. An image processing apparatus comprising:
a dividing unit configured to divide image data in PDL data on a tile-by-tile basis;
a determination unit configured to determine whether each of the tiles divided by the dividing unit has a tile attribute for lossless-compression or a tile attribute for lossy-compression;
an intermediate data generation unit configured to generate intermediate data having different attributes by compressing each tile of the image data using a lossless compression method or a lossy compression method according to the tile attribute determined by the determination unit;
an intermediate data rendering unit configured to generate raster image data by decompressing the generated intermediate data; and an enlargement unit configured to perform an enlargement process on the image data or the raster image data according to the tile attribute determined by the determination unit, wherein the enlargement unit enlarges the image data at a timing after decompression of the intermediate data if a divided tile attribute is a flat fill portion, and enlarges the image data at a timing before generation of the intermediate data if a divided tile attribute is other than a flat fill portion.

2. The image processing apparatus according to claim 1, wherein the determination unit determines that a tile of the divided image data has the tile attribute for lossy-compression if the tile is a bitmap portion, and the determination unit determines that a tile of the divided image data has the tile attribute for lossless-compression if the tile is a flat fill portion.

3. The image processing apparatus according to claim 1, wherein the intermediate data generation unit compresses the image data divided into tiles using a lossless compression method or a lossy compression method according to the tile attribute, before generating the intermediate data.

4. The image processing apparatus according to claim 1, wherein the intermediate data rendering unit decompresses the intermediate data before the raster image data is generated from the intermediate data compressed using a lossless compression method or a lossy compression method.

5. The image processing apparatus according to claim 1 further comprising, a job data generation unit configured to generate job data by detecting an edge of drawing information of a drawing object generated by analyzing the PDL data.

6. The image processing apparatus according to claim 5, wherein the job data includes side information, a fill combining store, and fill information.

7. The image processing apparatus according to claim 5, wherein the drawing object includes an image object and a graphics object.

8. The image processing apparatus according to claim 7, wherein the graphics object provides the job data in which fill information is color data.

9. The image processing apparatus according to claim 8, wherein the graphics object is lossless-compressed before the intermediate data is generated from the image data, and is rotated or enlarged with respect to the raster image data generated by decompressing the intermediate data.

10. An image processing method for an image processing apparatus, the image processing method comprising:
   dividing image data in PDL data on a tile-by-tile basis;
   determining whether each of the divided tiles has a tile attribute for lossless-compression or a tile attribute for lossy-compression;
   generating intermediate data having different attributes by compressing each tile of the image data using a lossless compression method or a lossy compression method according to the determined tile attribute;
   rendering the generated intermediate data to generate raster image data by decompressing the intermediate data; and
   performing an enlargement process on the image data or the raster image data according to the determined tile attribute,
   wherein the enlargement process enlarges the image data at a timing after decompression of the intermediate data if a divided tile attribute is a flat fill portion, and enlarges the image data at a timing before generation of the intermediate data if a divided tile attribute is other than a flat fill portion.

11. The image processing method according to claim 10, wherein it is determined that the segmented image data has the tile attribute for lossy-compression if the segmented image data is a bitmap portion, and it is determined that the segmented image data has the tile attribute for lossless-compression if the segmented image data is a flat fill portion.

12. A non-transitory computer-readable storage medium storing a computer-executable process, the computer-executable process causing a computer to execute the image processing method according to claim 10.

* * * * *